(12) United States Patent
Podluzhny et al.

(10) Patent No.: US 10,908,982 B2
(45) Date of Patent: Feb. 2, 2021

(54) METHOD AND SYSTEM FOR PROCESSING DATA

(71) Applicant: YANDEX EUROPE AG, Lucerne (CH)

(72) Inventors: Denis Nikolaevich Podluzhny, Syktyvkar (RU); Andrey Vladimirovich Fomichev, Krasnogorsk (RU)

(73) Assignee: YANDEX EUROPE AG, Lucerne (CH)

( * ) Notice: Subject to any disclaimer, the term of this patent is extended or adjusted under 35 U.S.C. 154(b) by 14 days.

(21) Appl. No.: 16/433,186

(22) Filed: Jun. 6, 2019

(65) Prior Publication Data
US 2020/0110653 A1    Apr. 9, 2020

(30) Foreign Application Priority Data
Oct. 9, 2018    (RU) ................................ 2018135452

(51) Int. Cl.
*G06F 12/00*    (2006.01)
*G06F 11/07*    (2006.01)
(Continued)

(52) U.S. Cl.
CPC .......... *G06F 11/0778* (2013.01); *G06F 3/064* (2013.01); *G06F 3/067* (2013.01);
(Continued)

(58) Field of Classification Search
None
See application file for complete search history.

(56) References Cited

U.S. PATENT DOCUMENTS

| 5,247,677 A | 9/1993 | Welland et al. |
| 5,278,984 A | 1/1994 | Batchelor |

(Continued)

FOREIGN PATENT DOCUMENTS

| CN | 105653365 A | 6/2016 |
| CN | 103514037 B | 6/2018 |

(Continued)

OTHER PUBLICATIONS

Russian Search Report dated Feb. 25, 2020 issued in respect of the Russian Patent Application No. RU2018147497.
(Continued)

*Primary Examiner* — Jason W Blust
(74) *Attorney, Agent, or Firm* — BCF LLP

(57) ABSTRACT

A method and system for processing data is disclosed. The system has a storage for storing a log, a state machine communicatively coupled to the storage for maintaining the log by executing log-actions, where the log stores indications of the processed data. The state machine has a plurality of generations each of which has a respective GUID. A single one of the generations is designated as a master generation of the state machine at any given moment in time. The master generation has exclusive privileges for executing write log-actions to the log at the any given moment in time. The method includes transmitting, by a master-candidate generation, a block request to the log that is instrumental in (i) preventing execution of write log-actions from any generation having a given GUID that is inferior the GUID of the master-candidate, and allowing execution of write log-actions exclusively from the master-candidate.

38 Claims, 8 Drawing Sheets

(51) Int. Cl.
*G06F 16/17* (2019.01)
*G06F 3/06* (2006.01)
*G06F 9/46* (2006.01)

(52) U.S. Cl.
CPC ............ *G06F 3/0619* (2013.01); *G06F 9/466* (2013.01); *G06F 16/1734* (2019.01)

(56) References Cited

U.S. PATENT DOCUMENTS

| | | |
|---|---|---|
| 5,577,202 A | 11/1996 | Padgett |
| 5,640,563 A | 6/1997 | Carmon |
| 5,845,316 A | 12/1998 | Hillyer et al. |
| 6,023,720 A | 2/2000 | Aref et al. |
| 6,256,755 B1 | 7/2001 | Hook et al. |
| 6,553,472 B2 | 4/2003 | Yang et al. |
| 6,757,897 B1 | 6/2004 | Shi et al. |
| 6,791,992 B1 | 9/2004 | Yun et al. |
| 6,851,115 B1 | 2/2005 | Cheyer et al. |
| 6,859,931 B1 | 2/2005 | Cheyer et al. |
| 7,073,021 B2 | 7/2006 | Iren et al. |
| 7,177,866 B2 | 2/2007 | Holenstein et al. |
| 7,474,989 B1 | 1/2009 | Wilcoxon |
| 7,562,362 B1 | 7/2009 | Paquette et al. |
| 7,971,093 B1 | 6/2011 | Goel et al. |
| 8,117,621 B2 | 2/2012 | Singh et al. |
| 8,145,838 B1 | 3/2012 | Miller et al. |
| 8,254,172 B1 | 8/2012 | Kan et al. |
| 8,595,302 B2 | 11/2013 | Krishnamurthi et al. |
| 8,799,913 B2 | 8/2014 | Yoo et al. |
| 8,826,301 B2 | 9/2014 | Kim et al. |
| 8,838,539 B1 | 9/2014 | Ashcraft et al. |
| 8,850,018 B2 | 9/2014 | Massa et al. |
| 8,850,446 B2 | 9/2014 | Avni et al. |
| 8,930,954 B2 | 1/2015 | Hildrum et al. |
| 8,966,490 B2 | 2/2015 | Avni et al. |
| 9,037,826 B1 | 5/2015 | Brooker et al. |
| 9,047,331 B2 | 6/2015 | Rao et al. |
| 9,093,160 B1 | 7/2015 | Ellis et al. |
| 9,203,900 B2 | 12/2015 | Rao et al. |
| 9,251,195 B2 | 2/2016 | Yamada |
| 9,304,694 B2 | 4/2016 | Colgrove et al. |
| 9,348,592 B2 | 5/2016 | Jha |
| 9,354,813 B1 | 5/2016 | Dolan et al. |
| 9,400,682 B2 | 7/2016 | Persikov et al. |
| 9,477,521 B2 | 10/2016 | Truong et al. |
| 9,569,339 B1 | 2/2017 | Villalobos et al. |
| 9,639,396 B2 | 5/2017 | Pho et al. |
| 9,699,017 B1 | 7/2017 | Gupta et al. |
| 9,921,557 B2 | 3/2018 | Slupik et al. |
| 10,552,215 B1 | 2/2020 | Xu et al. |
| 10,572,323 B1 | 2/2020 | Zhai et al. |
| 2002/0099756 A1 | 7/2002 | Catthoor et al. |
| 2003/0115410 A1 | 6/2003 | Shriver |
| 2004/0213387 A1 | 10/2004 | Chandrasekaran |
| 2005/0047425 A1 | 3/2005 | Liu et al. |
| 2007/0002750 A1 | 1/2007 | Sang |
| 2007/0226332 A1 | 9/2007 | Becker-Szendy et al. |
| 2007/0268516 A1 | 11/2007 | Bugwadia et al. |
| 2008/0168452 A1 | 7/2008 | Molaro et al. |
| 2008/0320482 A1 | 12/2008 | Dawson et al. |
| 2009/0013154 A1 | 1/2009 | Du et al. |
| 2009/0292744 A1 | 11/2009 | Matsumura |
| 2010/0011182 A1 | 1/2010 | Le Moal et al. |
| 2010/0185847 A1 | 7/2010 | Shasha et al. |
| 2011/0145830 A1 | 6/2011 | Yamaguchi |
| 2011/0153566 A1 | 6/2011 | Larson et al. |
| 2011/0219100 A1 | 9/2011 | Dhuse et al. |
| 2011/0261698 A1 | 10/2011 | Kamerkar et al. |
| 2012/0046807 A1 | 2/2012 | Ruther et al. |
| 2012/0047317 A1 | 2/2012 | Yoon et al. |
| 2012/0124273 A1 | 5/2012 | Goss et al. |
| 2012/0278801 A1* | 11/2012 | Nelson ................ G06F 11/1438 718/1 |
| 2013/0132057 A1 | 5/2013 | Deng et al. |
| 2013/0191836 A1 | 7/2013 | Meyer |
| 2014/0019987 A1 | 1/2014 | Verma et al. |
| 2014/0074623 A1 | 3/2014 | Mohammadi et al. |
| 2014/0208327 A1 | 7/2014 | Cadambi et al. |
| 2014/0226565 A1 | 8/2014 | Velev et al. |
| 2014/0250438 A1 | 9/2014 | Shin et al. |
| 2014/0282572 A1 | 9/2014 | Kang |
| 2015/0128149 A1 | 5/2015 | Meijer et al. |
| 2015/0347185 A1 | 12/2015 | Holt et al. |
| 2015/0347211 A1 | 12/2015 | Dang et al. |
| 2016/0149964 A1 | 5/2016 | Pastro |
| 2016/0188376 A1 | 6/2016 | Rosas et al. |
| 2016/0266934 A1 | 9/2016 | Rimoni |
| 2016/0291885 A1 | 10/2016 | Pendharkar et al. |
| 2017/0031713 A1 | 2/2017 | Campbell et al. |
| 2017/0109203 A1 | 4/2017 | Liu et al. |
| 2017/0147488 A1 | 5/2017 | Vaquero |
| 2017/0177697 A1 | 6/2017 | Lee et al. |
| 2017/0308403 A1 | 10/2017 | Turull et al. |
| 2017/0374516 A1 | 12/2017 | Huo et al. |
| 2018/0006999 A1 | 1/2018 | Doukhvalov et al. |
| 2018/0041477 A1 | 2/2018 | Shaposhnik |
| 2018/0052710 A1 | 2/2018 | Choi et al. |
| 2018/0101448 A1 | 4/2018 | Ventura et al. |
| 2018/0114290 A1 | 4/2018 | Paltashev et al. |
| 2018/0157543 A1 | 6/2018 | Bellomo et al. |
| 2018/0293123 A1 | 10/2018 | Kondapalli et al. |
| 2019/0163546 A1 | 5/2019 | Ungar et al. |
| 2020/0252761 A1 | 8/2020 | Podluzhny |

FOREIGN PATENT DOCUMENTS

| | | |
|---|---|---|
| EA | 031078 B1 | 11/2018 |
| EP | 2110990 A1 | 10/2009 |
| EP | 1508850 A3 | 3/2015 |
| GB | 2351375 A | 12/2000 |
| RU | 2376635 C2 | 12/2009 |
| RU | 2388039 C2 | 4/2010 |
| RU | 2494453 C2 | 9/2013 |
| RU | 2533638 C2 | 11/2014 |
| RU | 2543558 C2 | 3/2015 |
| RU | 2547705 C2 | 4/2015 |
| RU | 2581551 C2 | 4/2016 |
| RU | 2628146 C2 | 8/2017 |
| RU | 2649788 C1 | 4/2018 |
| RU | 2665212 C2 | 8/2018 |
| RU | 2670573 C2 | 10/2018 |
| WO | 2012065018 A2 | 5/2012 |
| WO | 2016197716 A1 | 12/2016 |

OTHER PUBLICATIONS

Russian Search Report dated Feb. 25, 2010 issued in respect of the Russian Patent Application No. RU2018135460.
Grefen et al. "Two-Layer Transaction Management for Workflow Management Applications", Database and Expert Systems Applications, pp. 430-439, publication date: Sep. 1997430-439.
"Deadline scheduler", retrieved on Wikipedia on Jan. 21, 2019.
"Shortest seek first", retrieved on Wikipedia on Jan. 21, 2019.
"Elevator algorithm", retrieved on Wikipedia on Jan. 21, 2019.
Abeni et al, "Constant Bandwidth Server Revisited", EWiLi'14, Nov. 2014, Lisbon, Portugal.
Virtuozzo Storage 2.3, Installation Guide, Dec. 14, 2017, retrieved from https://docs.virtuozzo.com/virtuozzo_storage_2_installation_guide/planning-virtuozzo-storage-infrastructure/understanding-data-redundancy.html.
Ex Parte Quale Action dated Apr. 23, 2020 received in respect of a related U.S. Appl. No. 16/383,976.
Russian Search Report dated Nov. 8, 2019 issued in respect of the Russian Patent Application No. RU2018132711.
Russian Search Report dated Nov. 26, 2019 issued in respect of the Russian Patent Application No. RU2018144176.
Russian Search Report dated Nov. 26, 2019 issued in respect of the Russian Patent Application No. RU2018132714.
Russian Search Report dated Nov. 25, 2019 issued in respect of the Russian Patent Application No. RU2018135452.

(56) References Cited

OTHER PUBLICATIONS

Russian Search Report dated Oct. 30, 2019 issued in respect of the Russian Patent Application No. RU2018136221.
Ex Parte Quale Action dated Oct. 22, 2020 received in respect of a related U.S. Appl. No. 16/560,409.
Office Action dated Oct. 23, 2020 received in respect of a related U.S. Appl. No. 16/504,040.
Kumar et al, "Optimized Particle Swarm Optimization Based Deadline Constrained Task Scheduling in Hybrid Cloud", ICTACT Journal of Soft Computing, Jan. 2016, vol. 06, Issue 02, pp. 1117-1122 (Year: 2016).
Shin et al, "Deadline-Guaranteed Scheduling Algorithm with Improved Resource Utilization for Cloud Computing", 12th Annual IEEE Consumer Communications and Networking Conference (CCNC), 2015, pp. 814-819 (Year: 2015).
Chopra et al, "Deadline and Cost based Workflow Scheduling in Hybrid Cloud", 2013, IEEE, pp. 840-846 (Year: 2013).
Yuan et al, "Deadline divison-based heuristic for cost optimization in workflow scheduling". Information Sciences 179 (2009) 2562-2575, Elsevier, pp. 2562-2575 (Year: 2009).
Srinivasan et al, "Deadline-based scheduling of periodic task systems on multiprocessors", Information Processing Letters 84 (2002), 93-98, Elsevier, pp. 93-98 (Year: 2002).
Ruemmier "An Introduction to Disk Drive Modeling", Hewlett Packard Laboratories, IEEE, Mar. 1994, pp. 17-29 (Year 1994).
IEEE 100, The Authoritative Dictionary of IEEE Standards Terms, Seventh Edition, IEEE Press, 2000, pp. 245, 1184 (Year: 2000).
Office Action dated Nov. 12, 2020 received in respect of a related U.S. Appl. No. 16/367,537.
Office Action dated Nov. 20, 2020 received in respect of a related U.S. Appl. No. 16/776,011.

* cited by examiner

METHOD AND SYSTEM FOR PROCESSING DATA

CROSS-REFERENCE

The present application claims priority to Russian Patent Application No. 2018135452, entitled "Method and System for Processing Data," filed Oct. 9, 2018, the entirety of which is incorporated herein by reference.

FIELD

The present technology relates to distributed data processing and, specifically, to a method and system for processing data in a fault-tolerant computer environment.

BACKGROUND

Storage requirements for storing digital data are continuously increasing due to the large volume of digital data that is being created everyday. For example, various types of user data, organization data and/or application data may need to be stored. This increases the demand for data storage capacity. Cloud storage systems may provide data storage capacity to users and/or organizations in order to cope with these increasing storage capacity requirements.

Generally speaking, cloud storage is a model of computer storage in which the digital data is stored in logical pools. The physical storage, where the digital data is actually stored, spans multiple servers, possibly located in different locations (i.e. different data centers), and is typically managed by a company hosting cloud storage services. Users and/or organizations usually buy or lease storage capacity from cloud storage service providers in order to store their digital data. In return, cloud storage service providers are responsible for keeping the digital data available and accessible while ensuring that the physical storage is protected for avoiding data loss.

SUMMARY

Developers of the present technology have appreciated certain technical drawbacks associated with prior art solutions for keeping data available, accessible and for avoiding data loss.

Developers of the present technology have realized that conventional fault-tolerant implementation of the state machines have at least some drawbacks. For example, replicated state machines have multiple replicas that must be maintained at each given moment in time which requires dedicating additional computational resources of a system having a physically limited amount of computational resources.

Also, logs associated with each replica need to be "synchronized" amongst each other in order to ensure that the replicas are "mirroring" each other (that they are indeed identical replicas of the state machine). It should be noted that this mirroring may be facilitated via execution of a consensus algorithm. Executing a consensus algorithm is computationally expensive and, thus, requires a significant amount of overhead resources. In addition to be computationally expensive, the execution of the consensus algorithm is a time consuming task. Therefore, since the consensus algorithm needs to be executed for ensuring fault-tolerance of the replicated state machine, the execution of the consensus algorithm may slow down data processing functions of the replicated state machine.

In a first broad aspect of the present technology, there is provided a method of processing data in a distributed computer system. The method is executable in the distributed computer system. The distributed computer system has a storage device for storing a log, a state machine communicatively coupled to the storage device for maintaining the log by executing log-actions on the log, and where the log stores indications of the processed data. The state machine has a plurality of generations. Each one of the plurality of generations has a respective generation-unique identifier (GUID). A single one of the plurality of generations is designated as a master generation of the state machine at any given moment in time. The master generation of the state machine has exclusive privileges for executing write log-actions to the log at the any given moment in time. The method is executable at a current moment in time when the log is maintained by a current generation of the state machine. The current generation of the state machine (i) is the master generation of the state machine at the current moment in time, and (ii) is associated with a first GUID. The method comprises transmitting, by a master-candidate generation of the state machine, a block request to the log. The master-candidate generation of the state machine is a new generation of the state machine. The master-candidate generation of the state machine has a second GUID. The second GUID is sequential to the first GUID. The block request is instrumental in: preventing execution of write log-actions to the log from any generation of the state machine that has a given GUID that is inferior to the second GUID, and allowing execution of write log-actions exclusively from the master-candidate generation of the state machine. Transmission of the block request thereby designates the master-candidate generation of the state machine as the master generation of the state machine, instead of the current generation of the state machine.

In some implementations of the method, the data is representative of a transaction to be executed by the state machine.

In some implementations of the method, the storage device is a plurality of fault-tolerant storage devices.

In some implementations of the method, the plurality of fault-tolerant storage devices are implemented in a distributed manner.

In some implementations of the method, the state machine is a single state machine having a unique system-wide identifier.

In some implementations of the method, the distributed computer system comprises another state machine and another respectively associated log. Any given state machine is uniquely associated with a respective log to form a subsystem. Subsystems within the distributed computer system operate independently therebetween.

In some implementations of the method, the distributed computer system further comprises a database for executing transactions. The database is implemented as the state machine. The log stored within the fault-tolerant distributed storage is configured for tracking the transactions destined to the database for execution thereby.

In some implementations of the method, the distributed computer system comprises a director entity for managing the state machine. The method further comprises generating, by the director entity, prior to the current moment in time the master-candidate generation of the state machine.

In some implementations of the method, the master-candidate generation of the state machine is generated in response to a failure of the current generation of the state machine.

In some implementations of the method, the master-candidate generation of the state machine is generated in response to an expiration of a time limit of the current generation of the state machine.

In some implementations of the method, all of the director entity and the state machine are implemented as software modules.

In some implementations of the method, the respective software modules associated with the director entity and the state machine have different characteristics therebetween.

In some implementations of the method, the method further comprises, at another given moment in time that is after the given moment in time during which the current generation of the state machine is no longer designated as the master generation of the state machine: (i) receiving, by the current generation of the state machine, other data to be processed; and (ii) attempting, by the current generation of the state machine, to execute a given write log-action in the log. The given write log-action is indicative of the other data. At the another given moment in time the given write log-action of the current generation of the state machine is prevented from being executed in the log based on the first GUID of the current generation of the state machine.

In some implementations of the method, the method further comprises: transmitting, by the current generation of the state machine. A failure message indicative of a failure to process the other data.

In some implementations of the method, the other data is a transaction and wherein the state machine is implemented as a shard of a database and wherein the transaction is directed to the shard of the database.

In some implementations of the method, the log is being shared by each one of the plurality of generations of the state machine.

In some implementations of the method, any one of the plurality of generations of the state machine have read-action privileges to the log irrespective of which one of the plurality of generations of the state machine is the master generation of the state machine.

In some implementations of the method, when the master-candidate generation of the state machine is designated as the master generation of the state machine, the master-candidate generation of the state machine processes the log for transitioning into a latest state of the state machine.

In some implementations of the method, the log comprises at least one snapshot portion and a recently-added portion. The processing the log comprises at least one of: processing the at least one snapshot portion; and processing the recently-added portion.

In a second broad aspect of the present technology, there is provided a distributed computer system for processing data, having: a storage device for storing a log, a state machine communicatively coupled to the storage device for maintaining the log by executing log-actions on the log, and where the log stores indications of the processed data. The state machine has a plurality of generations. Each one of the plurality of generations has a respective generation-unique identifier (GUID). A single one of the plurality of generations is designated as a master generation of the state machine at any given moment in time. The master generation of the state machine has exclusive privileges for executing write log-actions to the log at the any given moment in time. At a current moment in time when the log is maintained by a current generation of the state machine, the current generation of the state machine (i) is the master generation of the state machine at the current moment in time, and (ii) is associated with a first GUID. A master-candidate generation of the state machine is a new generation of the state machine and has a second GUID that is sequential to the first GUID. T master-candidate generation of the state machine is configured to transmit a block request to the log, the block request being instrumental in: preventing execution of write log-actions to the log from any generation of the state machine that has a given GUID that is inferior to the second GUID, and allowing execution of write log-actions exclusively from the master-candidate generation of the state machine. The master-candidate generation of the state machine is thereby designated as the master generation of the state machine, instead of the current generation of the state machine.

In some implementations of the system, the data is representative of a transaction to be executed by the state machine.

In some implementations of the system, the storage device is a plurality of fault-tolerant storage devices.

In some implementations of the system, the plurality of fault-tolerant storage devices are implemented in a distributed manner.

In some implementations of the system, the state machine is a single state machine having a unique system-wide identifier.

In some implementations of the system, the distributed computer system comprises another state machine and another respectively associated log. Any given state machine is uniquely associated with a respective log to form a subsystem. Sub-systems within the distributed computer system operate independently therebetween.

In some implementations of the system, the distributed computer system further comprises a database for executing transactions. The database is implemented as the state machine. The log stored within the fault-tolerant distributed storage is configured for tracking the transactions destined to the database for execution thereby.

In some implementations of the system, the distributed computer system comprises a director entity for managing the state machine. The system is further configured to generate prior to the current moment in time the master-candidate generation of the state machine.

In some implementations of the system, the master-candidate generation of the state machine is generated in response to a failure of the current generation of the state machine.

In some implementations of the system, the master-candidate generation of the state machine is generated in response to an expiration of a time limit of the current generation of the state machine.

In some implementations of the system, all of the director entity and the state machine are implemented as software modules.

In some implementations of the system, the respective software modules associated with the director entity and the state machine have different characteristics therebetween.

In some implementations of the system, the system is further configured to, at another given moment in time being after the given moment in time during which the current generation of the state machine is no longer designated as the master generation of the state machine: (i) receive, by the current generation of the state machine, other data to be processed; (ii) attempt, by the current generation of the state machine, to execute a given write log-action in the log. The given write log-action is indicative of the other data. At the another given moment in time the given write log-action of the current generation of the state machine is prevented from being executed in the log based on the first GUID of the current generation of the state machine.

In some implementations of the system, the system is further configured to transmit, by the current generation of the state machine, a failure message indicative of a failure to process the other data.

In some implementations of the system, the other data is a transaction and wherein the state machine is implemented as a shard of a database and wherein the transaction is directed to the shard of the database.

In some implementations of the system, the log is being shared by each one of the plurality of generations of the state machine.

In some implementations of the system, any one of the plurality of generations of the state machine have read-action privileges to the log irrespective of which one of the plurality of generations of the state machine is the master generation of the state machine.

In some implementations of the system, when the master-candidate generation of the state machine is designated as the master generation of the state machine, the master-candidate generation of the state machine processes the log for transitioning into a latest state of the state machine.

In some implementations of the system, the log comprises at least one snapshot portion and a recently-added portion and the processing the log comprises at least one of: the at least one snapshot portion; and processing the recently-added portion.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope nor set forth the bounds of the present technology. In some cases, helpful examples of modifications may be set forth as an aid to understanding the present technology, and not to define the scope or set forth the bounds of the present technology. These modifications are not an exhaustive list and other modifications are likely possible.

Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

Figure 1:
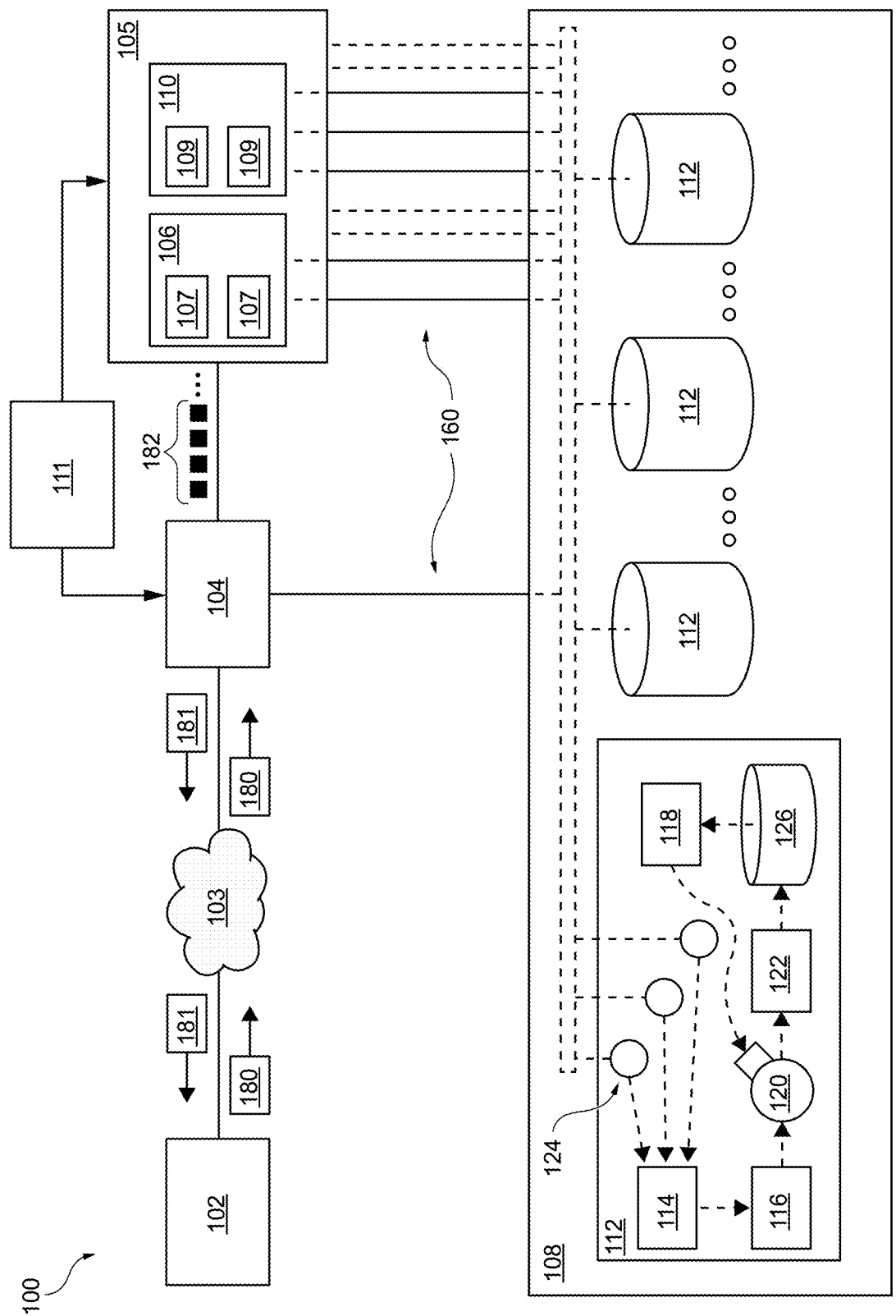
FIG. 1 depicts a system suitable for implementing non-limiting embodiments of the present technology.

Referring to FIG. 1, there is depicted a distributed computer-processing system 100 or a "distributed processing system" 100, for short. The distributed processing system 100 is configured for implementing non-limiting embodiments of the present technology. It is to be expressly understood that the distributed processing system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the distributed processing system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the distributed processing system 100 may provide in certain instances simple implementations of the present technology, and that where such is the case they have been presented in this manner as an aid to understanding. As persons skilled in the art would understand, various implementations of the present technology may be of a greater complexity.

The distributed processing system 100 comprises a request source 102, a communication network 103, a request pre-processing sub-system 104, a transaction processing sub-system 105, a transaction routing sub-system 106, a distributed storage sub-system 108, a database sub-system 110, and an operational sub-system 111.

How the above listed components of the distributed processing system 100 are implemented in accordance to the various non-limiting embodiments of the present technology will now be described.

Request Source

The request source 102 may be an electronic device associated with an end user (e.g., a client device) or, alternatively, any other sub-system of the distributed processing system 100 that is configured to provide user requests for the distributed processing system 100. It should be expressly understood that even though FIG. 1 depicts only a single instance of the request source 102, the distributed processing system 100 may have multiple instances of the request source 102. As illustrated herein, the request source 102 is part of the distributed processing system 100, however, in some embodiments of the present technology, the request source 102 may be external to the distributed processing system 100, and connected via a communication link (not numbered).

In fact, a typical implementation of the distributed processing system 100 can include a large number of request sources 102, such as hundred instances, thousand instances, million instances, and the like.

In some embodiments of the present technology, where the distributed processing system 100 is employed in a business-to-customer (B2C) environment, the request source 102 may be a given client device, such as a smartphone, for example, associated with a given user of the distributed processing system 100. For example, the distributed processing system 100 may potentially provide cloud storage services for the given client device of the given user.

In other embodiments of the present technology, where the distributed processing system 100 is employed in a business-to-business (B2B) environment, the request source 102 may be a given sub-system, such as a remote server, for example, providing user requests to the distributed processing system 100. For example, in some embodiments of the present technology, the distributed processing system 100 may provide fault-tolerant data processing and/or storage services for an operator of the given sub-system.

Broadly speaking, irrespective of whether the distributed processing system 100 is implemented as a B2C or a B2B system (or any other variation of the system for that matter), the request source 102 may be a given client device or another sub-system which can be internal or external to the distributed processing system 100.

As mentioned above, the request source 102 is configured to issue a plurality of requests 180, each of which will be referred herein below as the request 180. The nature of the request 180 will depend on a type of the request source 102. However, one example of the request 180 is a query expressed in Structured Query Language (SQL). Therefore, it is contemplated that in some embodiments of the present technology, the request 180 may be expressed in a declarative programming language, which means that the request 180 may be a declarative-type request.

Generally speaking, declarative programming is a style of building a structure and elements of computer programs that expresses the logic of a computation without describing a control flow thereof. Common declarative programming languages include, but are not limited to, SQL, XQuery and other database query languages. Broadly speaking, a declarative-type request is one that specifies an action in terms of "what" needs to be executed, as opposed to how "how" it needs to be executed.

This means that a given declarative-type request may be associated with a given condition under which a given action should be executed. The given condition may be, for example, a condition on which entity the given action is to be executed or where to obtain values for the given action to be executed.

As non-limiting examples, the given declarative-type request can be formulated such as: "Upsert a value of 5 in a cell associated with a key that is equal to a value of a cell associated with a key A" and "For all keys associated with a cell having a value of 5, replace that value with a value 10". However, it should be understood that examples of declarative languages and examples of declarative-type requests have been provided above for ease of illustration only, and that other declarative languages and other declarative-type requests may be used by the request source 102, without departing from the scope of the present technology.

In some embodiments of the present technology, the request source 102 is also configured to receive a plurality of responses 181, each of which will be referred herein below as the response 181. Generally speaking, in response to the request 180 being processed (or potentially not processed) by the distributed processing system 100, the distributed processing system 100 may generate the response 181 destined to the request source 102 associated with the respective request 180. The nature of the response 181 will depend on inter alia a type of the request source 102, the type of the respective request 180 and whether the distributed processing system 100 processed (or potentially not processed) the respective request 180. In some embodiments of the present technology, the distributed processing system 100 may generate the response 181 only in case of a failure to process the request, only in case of a successful processing of the request, or both.

In one example, during processing of the request 180, the distributed processing system 100 may be configured to request additional data from the request source 102 for continuing or completing processing of the request 180. In such a case, the distributed processing system 100 may be configured to generate the response 181 in a form of a data-request message being indicative of additional data requested by the distributed processing system 100 for continuing or completing the processing of the request 180.

In another example, if the distributed processing system 100 successfully processed the respective request 180, the distributed processing system 100 may be configured to generate the response 181 in a form of a success message being indicative of successful processing of the respective request 180.

In a further example, if the distributed processing system 100 failed to successfully process the respective request 180, the distributed processing system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the distributed processing system 100, issuing a new request destined to the distributed processing system 100, and the like.

Communication Network

The request source 102 is communicatively coupled to the communication network 103 for providing the request 180 to the distributed processing system 100 and for receiving the response 181 from the distributed processing system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the distributed processing system 100. For example, this request data-packet may comprise computer-executable instructions written in a given declarative-type programming language which represent the request 180. The communication network 103 is also configured to transmit inter alia a response data-packet comprising the response 181 from the distributed processing system 100 to the request source 102. For example, this response data-packet may comprise computer-executable instructions representing the response 181.

However, it is contemplated that, in some embodiments of the present technology, where the request source 102 is a given sub-system of the distributed processing system 100, for example, the communication network 103 may be implemented in a different manner from what is described above or, in some cases, may even be omitted, without departing from the scope of the present technology.

Operational Sub-System (Hive)

As mentioned above, the distributed processing system 100 comprises the operational sub-system 111, or simply "the hive", for short. Generally speaking, the hive 111 is a given software-based application (for example, a state machine) that is configured to manage at least some sub-systems of the distributed processing system 100, such as the request pre-processing sub-system 104, and the transaction processing sub-system 105, for example. It can be said that the hive 111 may be embodied as a given State Machine (SM) that is configured to generate, delete and/or balance load of other SMs forming the at least some sub-systems of the distributed processing system 100.

It should be understood that a given SM is a computational model employed by computer systems and which is defined by a list of "states". The given SM may change its current state in response to some external input and may be in exactly one state at any given moment in time. A change from a given state to another state of the given SM is called a "state transition".

It should be noted that, in the context of the present technology, the SMs forming the at least some sub-systems of the distributed processing system 100 are deterministic in nature, that is, each state transition of each such SM is uniquely determined by (i) a current state of a respective SM and (ii) a given external input provided to the respective SM. In other words, for a given current state of the respective SM and for a given external input, there is a unique next state of the respective SM. This deterministic nature of the state transition is true irrespective of which SM of the distributed processing system 100 is undergoing the state transition.

Therefore, as it will be described further below, in some embodiments of the present technology, the distributed processing system 100 may need to receive external inputs of a particular type that satisfy this deterministic property of the SMs of the at least some sub-systems of the distributed processing system 100.

Distributed Storage Sub-System

As mentioned above, the distributed processing system 100 also comprises the distributed storage sub-system 108. Generally speaking, the distributed storage sub-system 108 is configured to inter alia store "system data" indicative of states, state transitions, external inputs and/or outputs of at least some of the SMs of the distributed processing system 100. For example, the system data associated with a given SM of the distributed processing system 100 may be stored in a form of a log, and where the log is indicative of a historical listing of states, state transitions, external inputs and/or outputs of the given SM.

The distributed storage sub-system 108 is also configured to store "client data"—i.e. data associated with the processed external inputs by the distributed processing system 100. For example, in some embodiments of the present technology, client data may be stored as part of the system data in the distributed storage sub-system 108 without departing from the scope of the present technology.

In order to store the system data and/or the client data, the distributed storage sub-system 108 comprises a plurality of storage devices 112, each of which will be referred herein below as the storage device 112. In accordance with the various embodiments of the present technology, some or all of the plurality of storage devices 112 can be located in a single location or distributed amongst different locations. For example, some or all of the plurality of storage devices 112 can be located in a single server rack and/or a single data center and/or distributed over a plurality of server racks in one or more data centers.

In some embodiments of the present technology, the system data and/or the client data stored by a given storage device 112 may be replicated and stored on more than one other storage devices 112. In these embodiments, such replication and storing of the system data and/or the client data may result in a fault-tolerant storage of the system data and/or the client data by the distributed processing system 100. Fault-tolerant storage of the system data and/or the client data may allow preventing data loss in cases where a given storage device 112 of the distributed storage sub-system 108 becomes, temporarily or permanently, unavailable for storage and data retrieval purposes. Also, this fault-tolerant storage of the system data and/or the client data may allow preventing data loss in cases where a given SM of the distributed processing system 100 becomes, temporarily or permanently, unavailable.

It is contemplated that the storage device 112 may be implemented as a computer server. The computer server comprises at least one physical memory device (i.e. a memory drive 126) and hosts one or more software applications configured to execute computer-readable instructions. The memory drive 126 can be executed as solid state drive (SSD), hard disk drive (HDD), or the like. Therefore, it can be said that the at least one physical memory device can be implemented as either a movable disk type device or a immovable (static) disk type device.

For example, as depicted in FIG. 1, a given storage device 112 may be configured to host software applications, such as, but not limited to: (i) a virtual-drive (Vdrive) application 114, a physical-drive (Pdrive) application 115, at least one drive model application 118, at least one operation scheduling application 120, a real-time operation enforcing application 122, and at least one SM proxy 124. Functionalities of the above listed software applications and of the memory drive 126 for storing at least some system data and/or the client data will be described in greater detail further below with reference to FIG. 2.

Request Pre-Processing Sub-System

As previously alluded to, the transaction processing sub-system 105 may be formed by a number of deterministic SMs that require receiving external inputs of a particular type and which satisfy the deterministic property of the deterministic SMs. It should also be recalled that the request source 102 issues the request 180 in a form of a declarative-type request.

As such, the request pre-processing sub-system 104 is configured to receive the request 180, which is the declarative-type request originated from the request source 102, and to pre-process/translate the request 180 into a plurality of deterministic transactions 182 that satisfy the deterministic property of the number of deterministic SMs forming the transaction processing sub-system 105.

Therefore, broadly speaking, the purpose of the request pre-processing sub-system 104 is to ensure that the transaction processing sub-system 105 is able to process the request 180 by pre-processing/translating the request 180 into a plurality of transactions that are processable by the deterministic SMs of the transaction processing sub-system 105.

It should be noted that the request pre-processing sub-system 104 is also configured to generate the response 181 to be transmitted to the request source 102. Indeed, the request pre-processing sub-system 104 is communicatively coupled to the transaction processing sub-system 105, not only to transmit thereto the plurality of deterministic transactions 182, but also to receive therefrom information regarding processing of the plurality of deterministic transaction 182. In some of the non-limiting embodiments of the present technology, the plurality of deterministic transactions 182 can be of one or more of any of a "write" type and a "read" type.

In some embodiments of the present technology, the request pre-processing sub-system 104 is implemented as at least one SM, without departing from the scope of the present technology.

In some embodiments of the present technology, it is contemplated that the distributed computer-processing system 100 of FIG. 1 may support ACID transactions. Broadly speaking, ACID (atomicity, consistency, isolation and durability) is an acronym for a set of transaction properties which are directed to maintain database reliability when transactions are executed. Therefore, in some embodiments of the present technology, it is contemplated that transactions destined to the transaction processing sub-system 105 may be atomical, consistent, isolated and durable, without departing from the scope of the present technology.

Transaction Processing Sub-System

Generally speaking, the transaction processing sub-system 105 is configured to receive and process the plurality of deterministic transactions 182, thereby processing the request 180 of the request source 102. The transaction processing sub-system 105 includes (i) the transaction routing sub-system 106 and (ii) the database sub-system 110, which will now be described in turn.

The database sub-system 110 includes a plurality of transaction destination locations (TDLs) and is partitioned into a plurality of shards 109, each of which will be referred herein below as the shard 109. In one non-limiting example, the database sub-system 110 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard 109 of the database sub-system 110 hosts a portion of the given database table. Hence, the given plurality of TDLs, corresponding to the respective rows of the given database table, is split between the plurality of shards 109 such that each shard 109 comprises a respective subset (e.g. range) of the given plurality of TDLs.

In some embodiments of the present technology, it is contemplated that each one of the plurality of shards 109 may be implemented by a respective deterministic SM. This means that, upon receiving a given transaction destined to a TDL of a given shard 109 implemented by a given SM, the given SM may process the transaction and thereby transition to a new state thereof from a current state thereof based on the given transaction, as explained above.

The transaction routing sub-system 106 is configured to route transactions from the plurality of deterministic transaction 182 to respective transaction destination locations TDLs and, therefore, to the respective shards 109 of the database sub-system 110. To that end, the transaction routing sub-system 106 may be formed by a plurality of ports that are generally configured to (i) receive the plurality of deterministic transactions 182 from the request pre-processing sub-system 104, (ii) order the plurality of deterministic transactions 182 into subsets of deterministic transactions destined to respective shards 109, and (iii) generate centralized per-shard orders for execution by the respective shards 109 of the deterministic transactions in each one of the centralized per-shard orders of execution.

It should be noted that each one of the plurality of ports forming the transaction routing sub-system 106 may be implemented as a respective SM. In some embodiments, it is contemplated that the plurality of ports may comprise two different types of ports for routing transactions from the plurality of deterministic transactions 182 to the respective shards 109. In other embodiments, at least some functionalities of the plurality of ports may be executed by the SMs corresponding to the plurality of shards 109.

Also, as depicted in FIG. 1, at least some of the SMs of the transaction processing sub-system 105 may be communicatively coupled to the distributed storage sub-system 108 by a respective communication link 160. Broadly speaking, the purpose of a given communication link 160 is to convey system data indicative of inter alia states, state transitions, external inputs and/or outputs of respective SMs to the distributed storage sub-system 108 for storage thereof. How the communication links 160 are established and how the distributed storage sub-system 108 is configured to store the system data will now be described in greater detail with reference to FIG. 2.

Figure 2:
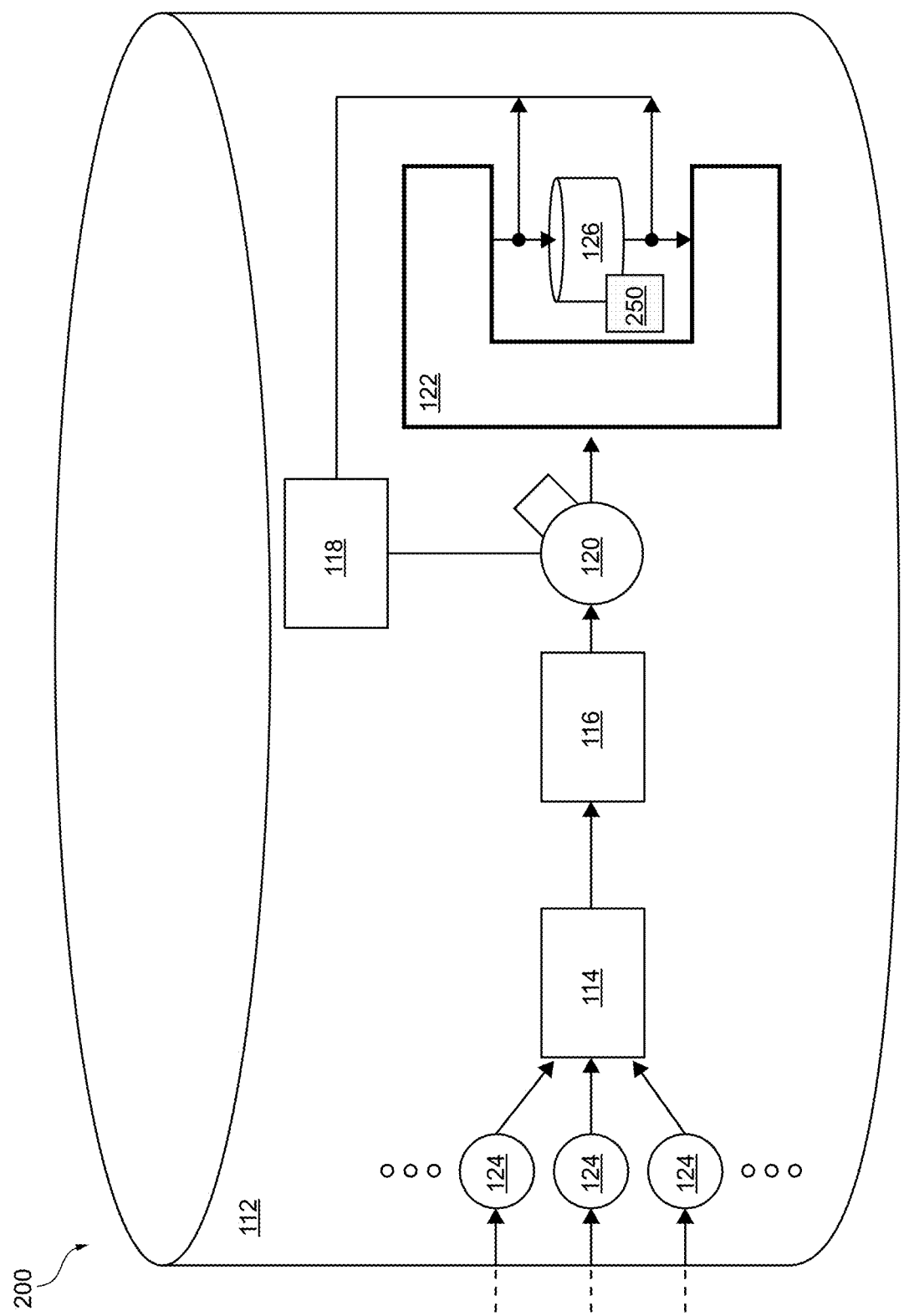
FIG. 2 depicts a storage device of a distributed storage sub-system of FIG. 1 in accordance with some embodiments of the present technology.

In FIG. 2, there is depicted the storage device 112 which is part of the distributed storage sub-system 108. As previously mentioned, the storage device 112 comprises the at least one SM proxy 124. The purpose of a given SM proxy is to manage communication between a given SM and the distributed storage sub-system 108. In some embodiments of the present technology, it is contemplated that the at least one SM proxy 124 of the storage device 112 may be an Application Programming Interface (API) managing communication between a given SM and the storage device 112. In other embodiments of the present technology, the at least one SM proxy 124 itself can be implemented as a SM. In other embodiments of the present technology, the at least one SM proxy 124 can be implemented as a software module (not in itself a SM) for executing functions described immediately above.

In some embodiments of the present technology, a given SM proxy 124 may be configured to (i) receive system data indicative of a log update of a given SM via a respective communication link 160, (ii) process the system data, and (iii) transmit the processed system data to a respective Vdrive application 114 for further processing.

The at least one SM proxy 124 may be configured to process the system data, for example, for ensuring consistency and fault-tolerance of the system data. It is contemplated that the at least one SM proxy 124 may be configured to perform erasure-coding of system data, in some embodiments of the present technology. Broadly speaking, erasure-coding is an encoding method in which data is provided with redundancy and is then split into several fragments. Such redundancy provision and fragmentation may facilitate restoration of data if one ore more fragments are lost due to faults in a given system.

It is contemplated that the so-processed system data by the at least one SM proxy 124 is received by the at least one respective Vdrive application 114 of the storage device 112. The purpose of a given Vdrive application 114 is to process the system data received from the at least one SM proxy 124 and, in response, generate corresponding I/O operations that are to be executed by the memory drive 126 for storing the system data on the memory drive 126 of the storage device 112. Once the at least one Vdrive application 114 generates the I/O operations corresponding to the system data received thereby, the at least one Vdrive application 114 then transmits the I/O operations to the Pdrive application 116.

As such, it is contemplated that a given storage device 112 may have more than one SM proxies 124 for processing and transmitting system data to more than one respective Vdrive application 114, which in turn process the system data, generate respective I/O operations, and transmit the respective I/O operations to a single Pdrive application 116 of the storage device 112.

Broadly speaking, the purpose of the Pdrive application 116 is to control operation of the memory drive 126. For example, the Pdrive application 116 may be configured to perform encoding of I/O operations to be executed on the memory drive 126 and various other functionalities that facilitate reliable storage of data on the memory drive 126.

The Pdrive application 116 is commutatively coupled to the operation scheduling application 120 to transmit thereto the I/O operations. The operation scheduling application 120 is configured for scheduling the transmission of the I/O operations to the memory drive 126. It is contemplated that the operation scheduling application 120, or simply "scheduler" for short, may execute various scheduling schemes for determining an order in which the I/O operations are to be transmitted to the memory drive 126 for further execution.

It is contemplated that, in some embodiments of the present technology, the operation scheduling application 120 may be implemented as part of the Pdrive application 116. In other words, execution of various scheduling schemes may be performed by the Pdrive application 116, without departing from the scope of the present technology.

In one case, the operation scheduling application 120 may provide a scheduling scheme of a "fair" type. It should be understood that a given storage device 112 may require to store I/O operations corresponding to system data associated with more than one SMs. Also, each one of the more than one SMs is associated with a pre-determined proportion of drive bandwidth that the memory drive 126 may allocate for executing the I/O operations associated with that respective SM. Therefore, broadly speaking, fair-type scheduling schemes are configured to order the I/O operations to be transmitted to the memory drive 126 such that the drive bandwidth of the memory drive 126 for executing the ordered I/O operations is used in accordance with the pre-determined proportions associated with the more than one SMs.

In another case, the operation scheduling application 120 may provide a scheduling scheme of a "real-time" type. It should be recalled that the distributed processing system 100 may be employed for providing cloud storage services. In many such implementations, it may be desirable to process system data and store it according to real-time requirements or, in other words, within a very short interval of time. As such, in order to support real-time requirements of the distributed processing system 100, the I/O operations may be associated with respective deadlines that are indicative of a moment in time after which the execution of the respective I/O operations is no longer performed within an acceptable amount of time for supporting real-time requirements of the distributed processing system 100. Therefore, broadly speaking, real-time scheduling schemes are configured to order the I/O operations to be transmitted to the memory drive 126 such that the I/O operations are to be executed by the memory drive 126 within respectively associated deadlines.

In a further case, the operation scheduling application 120 may provide a hybrid scheduling scheme. In other words, the operation scheduling application 120 may provide a scheduling scheme that is able to order the I/O operations for transmission of the memory drive 126 for execution such that the pre-determined proportions of drive bandwidth for each respective SM is respected and that respective deadlines of the I/O operations are also respected.

As previously mentioned, the memory drive 126 is a storage medium for executing I/O operations and thereby storing system data transmitted to the storage device 112. For example, the memory drive 126 may be implemented as an HDD or an SSD. The memory drive 126 includes a drive-internal logic 250 for selecting a given I/O operation for current execution amongst all I/O operations transmitted thereto.

It should be noted that I/O operations may potentially be sent one-by-one for execution to the memory drive 126, but this would result in an increased latency between the memory drive 126 and other components of the storage device 112. Therefore, the I/O operations may also be transmitted in batches or groups of I/O operations to the memory drive 126. Once a batch or group of I/O operations is received by the memory drive 126, the drive-internal logic 250 is configured to select amongst the I/O operations available thereto (from the batch) a most efficient I/O operation for execution.

For example, the most efficient I/O operation may be selected based on a variety of criteria such as, for example, a location where a previous I/O operation has been executed on the memory drive 126 and locations of the I/O operations available to the memory drive 126 where they are ought to be executed on the memory drive 126. In other words, the drive-internal logic 250 is configured to select, for current execution, a most efficient one (from the perspective of the memory drive 126) amongst all the I/O operations available to the memory drive 126 at a given moment in time.

For that reason, in some cases, although the operation scheduling application 120 may have ordered I/O operations in a specific order of transmission for respecting the real-time requirements of the distributed processing system 100, the drive-internal logic 250 of the memory drive 126 may instruct the memory drive 126 to organize them in an execution order that is different from the transmission order selected by the operation scheduling application 120. Therefore, it may happen that the execution order may no longer respect the real-time requirements of the distributed processing system 100 (especially as additional I/O operations are received from the operation scheduling application 120, which additional I/O operations may be more "efficient" from the perspective of the memory drive 126 and that may be picked over non-yet-executed 110 operations).

In order to ensure real-time operation of the storage device 112 and to avoid the above-described problem (which is also known as "operation stagnation"), the storage device 112 may include the real-time operation enforcing application 122. Broadly speaking, the real-time operation enforcing application 122 allows controlling which I/O operations amongst those that have been already ordered by the operation scheduling application 120 are transmitted at any given time to the memory drive 126 for execution.

It is contemplated that, in some embodiments of the present technology, the real-time operation enforcing application 122 may be implemented as part of the Pdrive application 116. In other words, the above-mentioned functionalities of the real-time operation enforcing application 122 may be performed by the Pdrive application 116, without departing from the scope of the present technology.

The storage device 112 is also configured to host at least one respective drive model application 118 for each memory drive 126 of the storage device 112. Broadly speaking, the drive model application 118 is configured to emulate ideal operation of the memory drive 126 for diagnostic analyses of the memory drive 126. In other embodiments, however, the operation scheduling application 120 may also be configured to employ the drive model application 118 for ordering the I/O operations for transmission to the memory drive 126.

It is contemplated that, in some embodiments of the present technology, the at least one respective drive model application 118 may be implemented as part of the Pdrive application 116. In other words, the above-mentioned functionalities of the at least one respective drive model application 118 may be performed by the Pdrive application 116, without departing from the scope of the present technology.

Conventional Replicated State Machine

As mentioned above, the distributed processing system 100 of FIG. 1 may comprise one or more SMs. It should be noted that the SMs implemented as part of the distributed processing system 100 may be implemented in a fault-tolerant manner. Broadly speaking, fault-tolerance is a property that enables a system to continue operating properly in the event of a failure (e.g., or one or more "faults" within) of some of its components. Ensuring fault-tolerance of some components of the distributed processing system 100, such as the SMs of the distributed processing system 100, for example, may allow the operators to reduce the likelihood of data loss and keep the digital data available and accessible for customers and businesses.

In some embodiments of the present technology, a fault-tolerant implementation of the SMs of the distributed processing system 100 may be different from conventional fault-tolerant implementations of SMs.

Figure 3:
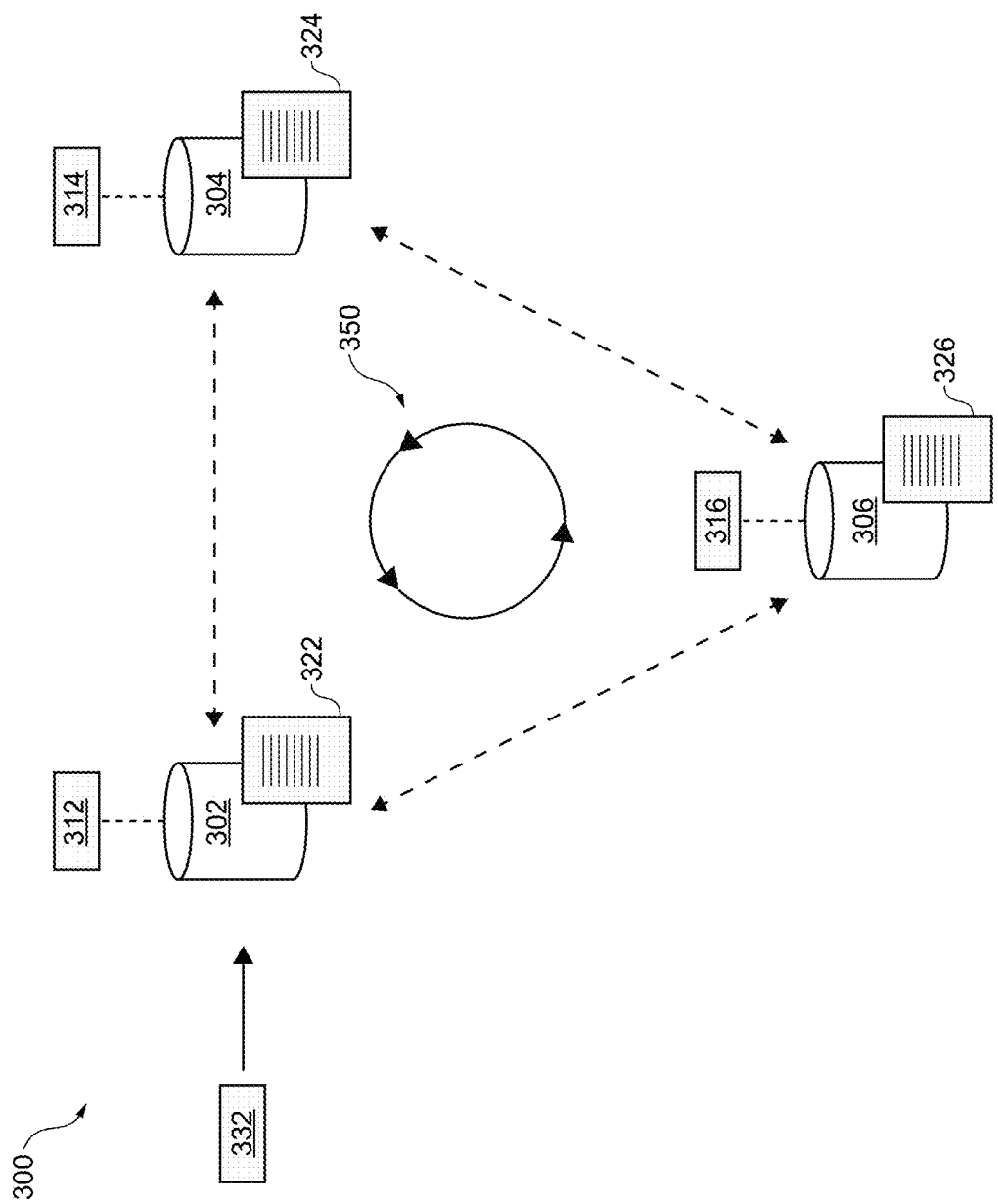
FIG. 3 depicts a conventional fault-tolerant implementation of a State Machine in accordance with prior art technologies.

With reference to FIG. 3, there is depicted a conventional fault-tolerant implementation of a given SM. FIG. 3 depicts a conventional Replicated State Machine (RSM) 300. Generally speaking, SM replication is a method for implementing a fault-tolerant service by replicating servers and coordinating client interactions with its replicas. For example, the RSM 300 includes three replicas, namely a first replica 312, a second replica 314 and a third replica 316.

Each one of the first replica 312, the second replica 314 and the third replica 316 is hosted by a respective one or more servers storing a respective log. The first replica 312 is hosted by a first server 302 that locally stores a first log 322 of the first replica 312. The second replica 314 is hosted by a second server 304 that locally stores a second log 324 of the second replica 314. The third replica 316 is hosted by a third server 306 that locally stores a third log 326 of the third replica 316.

As previously mentioned, a given log is indicative of a historical listing of states, state transitions and external inputs of a given SM. In this case, the first log 322 is indicative of such a historical listing for the first replica 312. The second log 324 is indicative of such a historical listing for the second replica 314. The third log 326 is indicative of such a historical listing for the third replica 316.

Let it be assumed that the first replica 312 receives external data 332. As a result, the first replica 312 may process the external data 332 and may transition to a next state of the first replica 312. This means that system data may be sent to the first server 302, which sending may take the form of a log update, for updating the first log 322 associated with the first replica 312.

In order for the second replica 314 and the third replica 316 to be in a same state as the first replica 312 a consensus algorithm 350 is typically executed. For example, the consensus algorithm 350 may be a given algorithm from the Paxos family of protocols. Generally speaking, Paxos protocols are employed for solving consensus in a network of unreliable processing entities.

The consensus algorithm 350 may be used to, in a sense, "synchronize" the first log 322, the second log 324 and the third log 326. In this case, once the consensus algorithm 350 is executed, the second replica 314 and the third replica 316 may have a same state as the current state of the first replica 312. As a result, if the first replica 312 is communicatively decoupled from the system or becomes unavailable, any one of the second replica 314 and the third replica 316 may replace the first replica 312.

In this case, the second replica 314 and the third replica 316 that, in a sense, "mirror" the first replica 312 due to the execution of the consensus algorithm 350, allow a fault-tolerant implementation of the RSM 300 since any one of the second replica 314 and the third replica 316 may be used for continuing operation of the RSM 300 even though the first replica 312 is communicatively decoupled or became unavailable. It should be noted that the above description of the consensus algorithm 350 has been greatly simplified and various alternative prior art solutions for the consensus algorithm 350 may be implemented in a more complicated manner.

The developers of the present technology have realized that the conventional fault-tolerant implementation of the RSM 300 has at least some drawbacks.

For instance, multiple replicas of a given SM, such as the first replica 312, the second replica 314 and the third replica 316 of the RSM 300 must be maintained at each given moment in time which requires dedicating additional computational resources of a system having a physically limited amount of computational resources.

In another instance, the first log 322, the second log 324 and the third log 326 are stored locally on the first server 302, the second server 304, and the third server 306, respectively, need to be "synchronized" amongst each other in order to ensure that the first replica 312, the second replica 314 and the third replica 316 are "mirroring" each other (that they are indeed identical replicas of the SM).

However, it should be noted that the execution of the consensus algorithm 350 is computationally expensive and, thus, requires a significant amount of overhead resources. In addition to be computationally expensive, the execution of the consensus algorithm 350 is a time consuming task. Therefore, since the consensus algorithm 350 needs to be executed for ensuring fault-tolerance of the RSM 300, the execution of the consensus algorithm 350 may slow down data processing functions of the RSM 300.

State Machine Over a Shared Log

Figure 4:
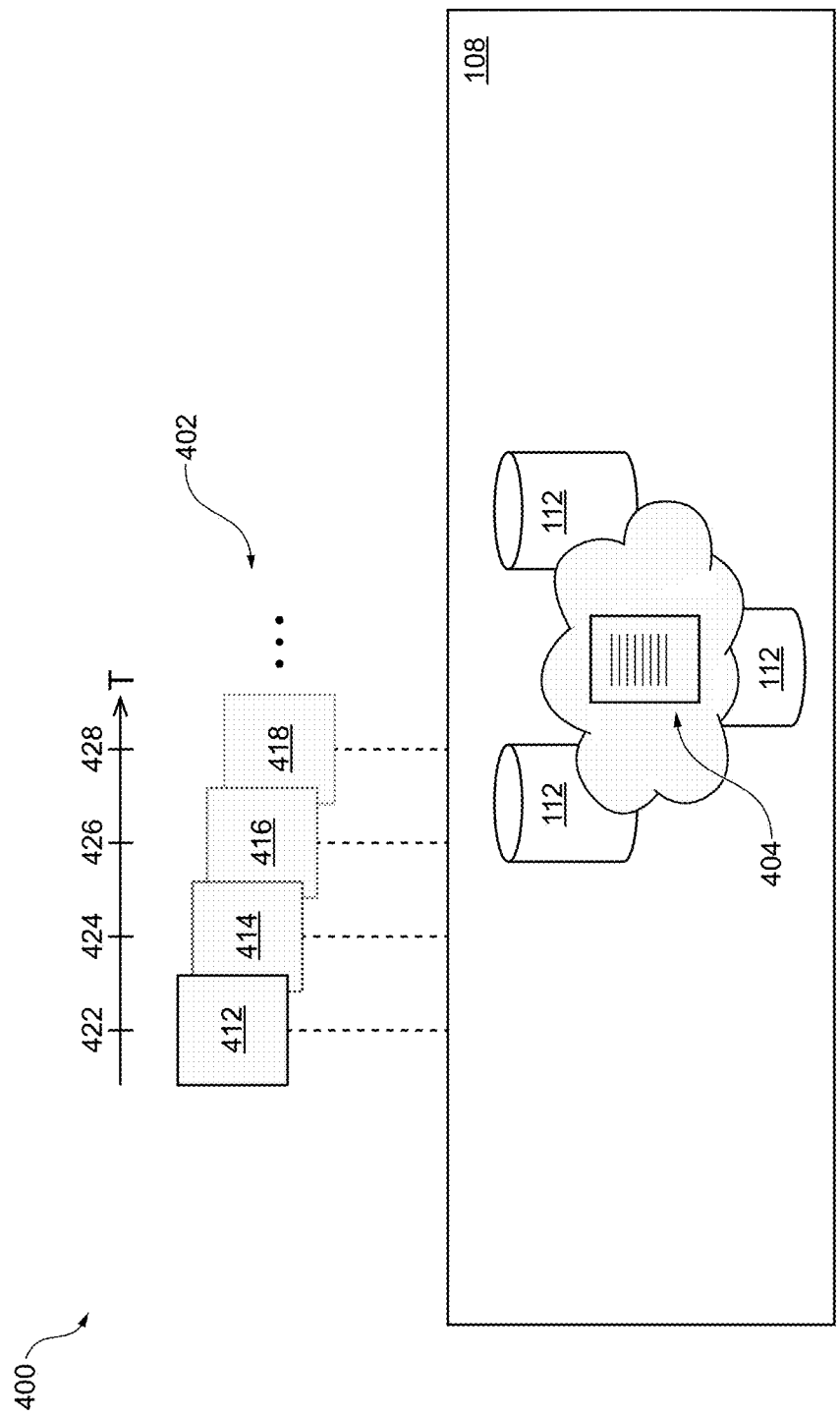
FIG. 4 depicts a fault-tolerant implementation of a State Machine in accordance with some embodiments on the present technology.

In order to overcome at least some drawbacks of the conventional fault-tolerant implementations of SMs, such as the RSM 300, developers of the present technology have devised the non-limiting embodiments of the present technology for implementing the fault-tolerant SMs, such as a State Machine Over a Shared Log (SMOSL) 400 depicted in FIG. 4.

The SMOSL 400 is a given SM that has a plurality of generations 402. A given one of the plurality of generations 402 of the SMOSL 400 may be launched or generated by the hive 111 or other processes, such as a boot-strapping process ("boot-strappers" for short) of the distributed processing system 100. In which cases and for what purposes the hive 111 or other boot-strappers may be configured to launch or generate a given generation of the SMOSL 400 will be described in greater details herein below.

However, it should be noted that each one the plurality of generations 402 of the SMOSL 400 is launched or generated by the hive 111 or other boot-strappers at different moments in time. This means that the plurality of generations 402 of the SMOSL 400 is "spread" in time as indicated by "T" axis in FIG. 4.

For example, the plurality of generations 402 of the SMOSL 400 may comprise:
- a first generation 412 that may be launched at a first moment in time 422;
- a second generation 414 that may be launched at a second moment in time 424;
- a third generation 416 that may be launched at a third moment in time 426;
- a fourth generation 418 that may be launched at a fourth moment in time 428; and
- so forth.

It should be noted that, although the plurality of generations 402 is depicted as comprising four generations, it is contemplated that the SMOSL 400 may have fewer than or more than four generations over the lifecycle of the SMOSL 400 without departing from the scope of the present technology.

The SMOSL 400 is also communicatively coupled to a shared log 404. It is contemplated that the shared log 404 may be stored by a given storage device. The given storage device storing the shared log 404 may be a given fault-tolerant storage device or a given plurality of fault-tolerant storage devices. It is contemplated that, in some embodiments of the present technology, the given plurality of fault-tolerant storage devices may be executed in a distributer manner. For example, as depicted in the non-limiting example of FIG. 4, the shared log 404 is stored in the distributed storage sub-system 108 of the distributed processing system 100 using more than one storage devices 112.

It is important to understand that, as opposed to the RSM 300 where a given SM is replicated for allowing a fault-tolerant implementation of the given SM, the SMOSL 400 may allow a fault-tolerant implementation of a given SM by storing the shared log 404 in a fault-tolerant storage system. Thus, it can be said that fault-tolerance of the RSM 300 is provided at the application layer. It can also be said that fault-tolerance of the SMOSL 400 may be provided at the storage layer. It can also be said that fault-tolerance of the SMOSL may be provided at a lower layer if compared to the layer at which the fault-tolerance of the RSM 300 is provided.

In accordance with the non-limiting embodiments of the present technology, the shared log 404 is a single log that is "shared" amongst the plurality of generations 402. For example, the shared log 404 is shared amongst the plurality of generations 402 such that:

between the first moment in time 422 and the second moment in time 424, the shared log 404 may be used by the first generation 412 of the plurality of generations 402 for executing write log-actions; and between the second moment in time 424 and the third moment in time 426, the shared log 404 may be used by the second generation 414 of the plurality of generations 402 for executing write log-actions.

However, the shared log 404 is not shared by two or more given generations of the plurality of generations 402 at any given moment in time—that is, at any given moment in time the shared log 404 cannot be used by more than one generation of the plurality of generations 402 of the SMOSL 400 for executing write log-actions. Put another way, at any given moment in time, a single instance of the SMOSL 400 (i.e. a single one of the plurality of generations 402) has exclusive write-privileges for the shared log 404.

A given generation of the plurality of generations 402 of the SMOSL 400 that is able to execute write log-actions to the shared log 404 at a given moment in time is a master generation of the SMOSL 400 at that given moment in time. In the context of the present technology, a given master generation of the SMOSL 400 is a given one of the plurality of generations 402 of the SMOSL 400 that has exclusive privileges for executing write log-actions on the shared log 404 at any given moment in time, until an other given one of the plurality of generations 402 of the SMOSL 400 is designated as a new master generation of the SMOSL 400.

Once the new master generation of SMOSL 400 is designated, it can be said that the new master generation of the SMOSL 400, in a sense, "inherits" the exclusive privileges of a previous master generation of the SMOSL 400 for executing write log-actions on the shared log 404. In which cases, for what purposes and how the new master generation of the SMOSL 400 is designated will be described in greater details herein further below.

At least some functionalities of the SMOSL 400 will now be described with reference to FIGS. 5 to 7.

Figure 5:
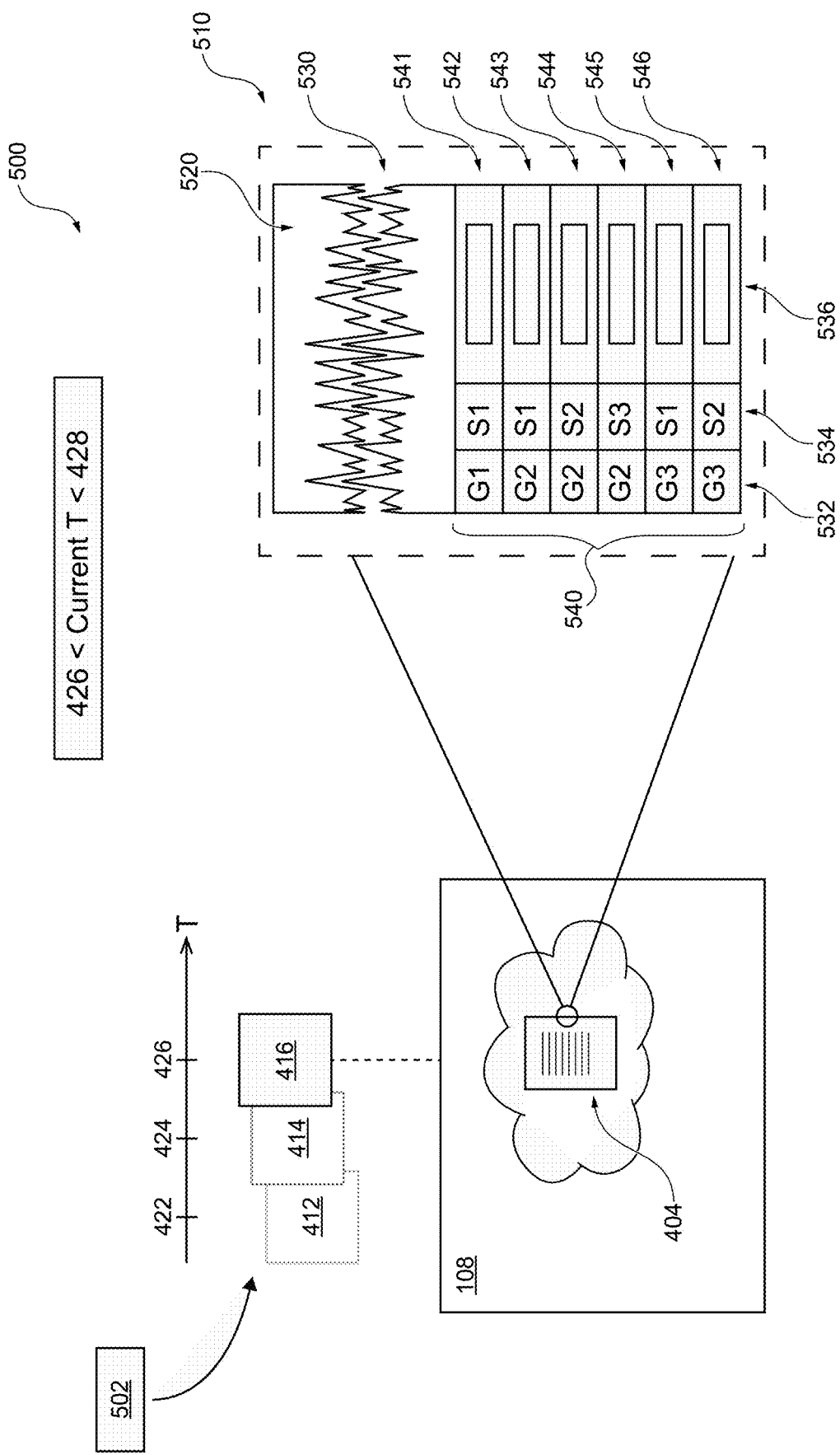
FIG. 5 depicts a first representation of the State Machine of FIG. 4 at a first current time.

In FIG. 5, there is depicted a data source 502. For example, the data source 502 may be, but is not limited to, another SM of the distributed processing system 100, a client device associated with a user, or any other computer entity that is configured to provide data to the distributed processing system 100 or to any other suitable computer system that has one or more SMOSLs.

In the non-limiting example of the FIG. 1, the SMOSL 400 may be implemented as a given port 107 of the transaction routing sub-system 106 or as a given shard 109 of the database sub-system 110. It is contemplated that the distributed processing system 100 may comprise a plurality of SMOSLs and where each one or some of the plurality of SMOSLs are implemented similarly to how the SMOSL 400 is implemented, without departing from the scope of the present technology.

It is contemplated that the data provided by the data source 502 may be implemented as a deterministic transaction to be executed or processed by the SMOSL 400. In other embodiments of the present technology, the data provided by the data source 502 may be a query submitted to the distributed processing system 100 from an external computer system (not depicted).

In FIG. 5, there is depicted a first representation 500 of the SMOSL 400. It should be noted that the first representation 500 of the SMOSL 400 is at a current time that is between the third moment in time 426 and the fourth moment in time 428, as shown at the top of FIG. 5.

Let it be assumed that the SMOSL 400 has been receiving data to be processed from the data source 502, prior to the current time of the first representation 500. Generally speaking, the SMOSL 400 is configured to process the data received from the data source 502, potentially generate an output based on the processed data and store indications of the processed data in the shared log 404 via write log-actions.

For example, prior to the current time of the first representation 500, the SMOSL 400 may have received a plurality of data packets (not depicted) comprising respective data to be processed by the SMOSL 400. In response, the SMOSL 400 processed the respective data and stored indications of the respective processed data in the shared log 404.

On the right side of FIG. 5, there is depicted a zoomed-in representation 510 of the shared log 404 at the current time of the first representation 500 of the SMOSL 400. The zoomed-in representation 510 comprises a snapshot portion 520 of the shared log 404 and a recently-added portion 530 of the shared log 404.

As previously alluded to, and broadly speaking, the shared log 404 is a historical listing representative of states, state transitions and external inputs and outputs of the SMOSL 400. It is contemplated that the shared log 404 may be indicative of an additional or alternative historical information of the SMOSL 400, without departing from the scope of the present technology. Since this historical listing may become very large in size, in some embodiments of the present technology, at some intervals of time or memory space occupied by the shared log 404, the shared log 404 may reach a checkpoint at which a snapshot of the historical listing at that moment in time is generated and stored, instead of the historical listing at that moment in time. This snapshot may be smaller in size to the historical listing based on which it has been generated, which allows to save memory resources for storing the shared log 404.

Therefore, at some moment in time, the shared log 404 may have reached a given checkpoint at which the snapshot portion 520 has been generated and stored. Hence, the recently-added portion 530 of the shared log 404 may correspond to a historical listing of the SMOSL 400 (i) since the checkpoint associated with the snapshot portion 520 and (ii) until the current time of the first representation 500.

The historical listing of the recently-added portion 530 comprises a plurality of log-entries 540, each of which may have been stored in the shared log 404 in response to respective write log-actions sent by given generations of the SMOSL 400.

It should be noted, as depicted on the left side of FIG. 5, by the current time of the first representation 500 of the SMOSL 400, the SMOSL 400 has three generations, namely the first generation 412, the second generation 414, and the third generation 416.

Each one of the generations of the SMOSL 400 has a generation-unique identifier (GUID). For example, the first generation 412 may have a GUID "G1", the second generation 414 may have a GUID "G2", and the third generation 416 may have a GUID "G3".

Also, as previously mentioned, the SMOSL 400 has one given master generation at any given moment in time that has exclusive privileges to execute write log-actions to the shared log 404. For example, (i) between the first moment in time 422 and the second moment in time 424, the first generation 412 has been the master generation of the SMOSL 400, and (ii) between the second moment in time 422 and the third moment in time 426, the second generation 414 has been the master generation of the SMOSL 400.

As such, let it be assumed that the data source 502 sent first given data to the SMOSL 400 for processing at a moment in time being between the first moment in time 422 and the second moment in time 424. As such, at that moment in time, the first generation 412 was the master generation of the SMOSL 400 and, therefore, at that moment in time, the first generation 412 might have executed a given write log-action on the shared log 404. This given write log-action of the first generation 412 of the SMOSL 400 is associated with a first log-entry 541 in the recently-added portion 530.

The first log-entry 541 comprises (i) the GUID of the first generation 412, being G1, (ii) a step of the first generation 412, being S1, and (iii) a log record corresponding to the data having been written into the shared log 404 as part of the given write log-action being executed. The step may correspond to a counter indicative of write log-actions performed by a given generation. Assuming that the given write log-action of the first generation 412 is the first write log-action performed by the first generation 412, the step of the given write log-action is therefore S1.

Also, let it be assumed that the data source 502 sent second given data to the SMOSL 400 for processing at a moment in time being between the second moment in time 424 and the third moment in time 426. As such, at that moment in time, the second generation 414 was the master generation of the SMOSL 400 and, therefore, at that moment in time, the second generation 414 may have executed a given write log-action to the shared log 404. This given write log-action of the second generation 414 of the SMOSL 400 is associated with a second log-entry 542 in the recently-added portion 530.

Similarly, let it be assumed that the data source 502 sent third given data and fourth given data to the SMOSL 400 for processing at respective moments in time that are between the second moment in time 424 and the third moment in time 426. As such, at those respective moments in time, the second generation 414 was the master generation of the SMOSL 400 and, therefore, at those respective moments in time, the second generation 414 may have executed respective given write log-actions to the shared log 404. These respective given write log-actions of the second generation 414 of the SMOSL 400 are associated with a third log-entry 543 and with a fourth log-entry 544, respectively, in the recently-added portion 530.

It should be noted that, in this case, the second generation 414 executed three write log-actions to the shared log 404. As such, the second log-entry 542, the third log-entry 543 and the fourth log-entry 544 correspond to different steps of the second generation 414 and, therefore, the step value is incremented from a given log-entry amongst the second log-entry 542, the third log-entry 543 and the fourth log-entry 544 to a next log-entry amongst the second log-entry 542, the third log-entry 543 and the fourth log-entry 544.

Similarly, let it be assumed that the data source 502 sent fifth given data and sixth given data to the SMOSL 400 for processing at respective moments in time being between the third moment in time 426 and the current moment in time of the first representation 500. As such, at those respective moments in time, the third generation 416 was the master generation of the SMOSL 400 and, therefore, at those respective moments in time, the third generation 416 may have executed respective given write log-actions to the shared log 404. These respective given write log-actions of the third generation 416 of the SMOSL 400 are associated with a fifth log-entry 545 and with a sixth log-entry 546, respectively, in the recently-added portion 530.

In summary, the recently-added portion 530 comprises the plurality of log-entries 540. In this non-limiting example, the recently-added portion 530 has a GUID column 532, a step column 534 and a log record column 536. The GUID column 532 is indicative of GUIDs of generations of the SMOSL 400 that are associated with respective log-entries of the shared log 404. The step column 534 is indicative of a number of write log-actions executed by each one of generations of the SMOSL 400 on the shared log 404 and of a sequence in which the write log-actions have been executed by each one of generations of the SMOSL 400. The log record column 536 is indicative of data stored in the shared log 404 as part of respective write log-actions of each one of the generations of the SMOSL 400.

Figure 6:
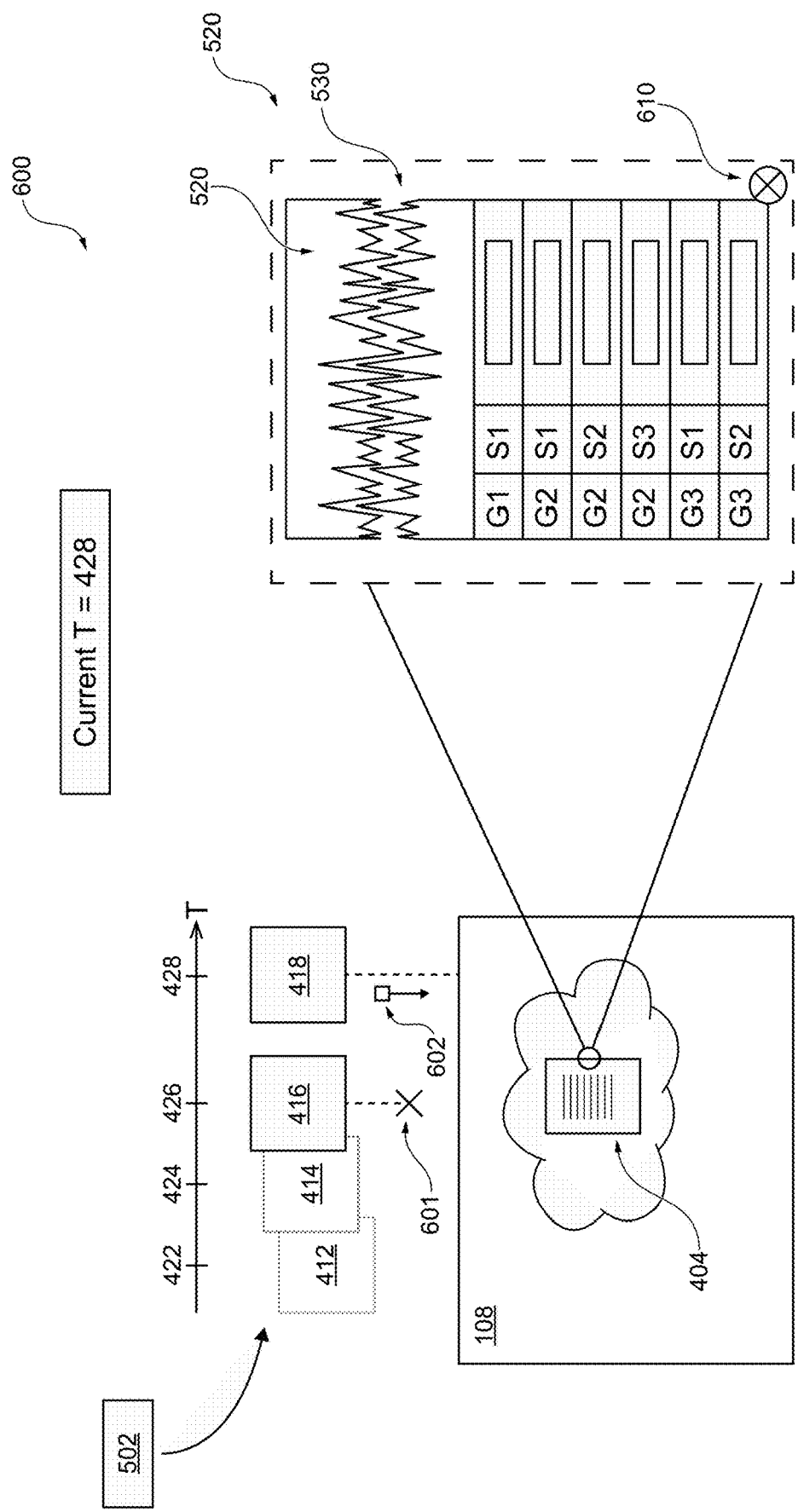
FIG. 6 depicts a second representation of the State Machine of FIG. 4 at a second current time.

With reference to FIG. 6, there is depicted a second representation 600 of the SMOSL 400. It should be noted that the second representation 600 of the SMOSL 400 is at a current time that is the fourth moment in time 428, as shown at the top of FIG. 6.

Let it be assumed that at the fourth moment in time 428 (the current time of the second representation 600), the hive 111 (see FIG. 1) or a given boot-strapper launches the fourth generation 418 of the SMOSL 400. The hive 111 or the given boot-strapper may launch the fourth generation 418 for different reasons.

In one example, the hive 111 or the given boot-strapper may launch the fourth generation 418 in response to determining or otherwise receiving an indication of the third generation 416 being communicatively uncoupled from the distributed storage sub-system 108, which is illustrated by a broken communication link 601 in FIG. 6. The third generation 416 may become communicatively uncoupled or fail for many reasons. For example, in some cases, the third generation 416 may encounter errors while processing data. In other cases, the third generation 416 may crash for a multitude of other reasons.

In another example, the hive 111 or the given boot-strapper may launch the fourth generation 418 in response to determining or otherwise receiving an indication of the third generation 416 being unavailable by the distributed storage sub-system 108. In one case, the broken communication link 601 may be caused by a fault in the network of the distributed processing system 100. This fault in the network of the distributed processing system 100 may be a result of, in some cases, a software-type malfunction in the network and, in other cases, a hardware-type malfunction in the network.

In yet a further example, the hive 111 or the given boot-strapper may launch the fourth generation 418 in response to determining or otherwise receiving an indication of the third generation 416 has expired. For example, in some embodiments of the present technology, it is contemplated that generations of the SMOSL 400 may be prescribed a given time limit of being the master generation and may be configured to expire once the given time limit is reached.

Irrespective of the reason why the hive 111 or the given boot-strapper launches the fourth generation 418, it is contemplated that at the fourth moment in time 428 the fourth generation 418 is a master-candidate generation of the SMOSL 400. In other words, the hive 111 or the given boot-strapper launches the fourth generation 418 at the fourth moment in time 428 with the purpose of the fourth generation 418 becoming a new master generation of the SMOSL 400.

It should be noted that the fourth generation 418 is associated with a GUID that is sequential to the GUID of the third generation 416. In one non-limiting example, the GUID of the fourth generation 418 may be G4.

In at least some non-limiting embodiments of the present technology, it is contemplated that all generations of the SMOSL 400 may be associated with sequentially increasing GUIDs, such that the GUIDs of the generations of the SMOSL 400 are indicative of an order in which the generations of the SMOSL 400 have been launched by the hive 111 and/or other boot-strappers of the distributed processing system 100.

For example, it should be recalled that the GUIDs of the first generation 412, of the second generation 414, and of the third generation 416 are G1, G2, and G3, respectively. As such, the hive 111 and/or an other boot-strapper may assign the GUID G4 to the fourth generation 418. As a result, G1, G2, G3 and G4 are indicative of the order in which the respective generations of the SMOSL 400 have been launched by the hive 111 and/or other boot-strappers.

Once the fourth generation 418 is launched and communicatively coupled with the distributed storage sub-system 108, and which is the master-candidate generation of the SMOSL at the fourth moment in time 428, the fourth generation 418 transmits a block request packet 602 to the shared log 404.

In some embodiments of the present technology, the block request packet 602 may be indicative of (i) the GUID of the fourth generation 418, being G4, and (ii) of a block request. For example, transmitting information indicative of the GUID of the fourth generation 418 may allow identifying that the block request originated from a new generation of the SMOSL 400 since G4 is sequential to the GUID G3 of the master generation of the SMOSL 400, which is the third generation 416 at that moment in time.

The block request transmitted by means of the block request packet 602 is instrumental in (i) preventing execution of write log-actions on the shared log 404 from any generation of the SMOSL 400 having a given GUID that is inferior to the GUID G4 of the fourth generation 418 and (ii) allowing execution of write log-actions exclusively from the master-candidate generation of the SMOSL 400 (being the fourth generation 418 at that moment in time).

In some embodiments of the present technology, the block request may be configured to provide a blocking algorithm 610 that is configured to (i) prevent execution of write log-actions on the shared log 404 from any generation of the SMOSL 400 having a given GUID that is inferior to G4, and (ii) allows execution of write log-actions exclusively from the fourth generation 418 associated with the GUID G4.

Therefore, it is contemplated that once the block request packet 602 is transmitted to the shared log 404 and that the blocking algorithm 610 is provided or implemented on the shared log 404, the master-candidate generation of the SMOSL 400 (in this case, the fourth generation 418) is designated as the master generation of the SMOSL 400, instead of the third generation 416 of the SMOSL 400.

In some embodiments of the present technology, when the fourth generation 418 is designated as the master generation of the SMOSL 400 (when the fourth generation 418 passes from the master-candidate generation status to the master generation status), the fourth generation 418 may be configured to process the shared log 404 in order to transition into a state that is representative of a latest state of the SMOSL 400.

It is contemplated that the fourth generation 418 may be configured to execute one or more read log-actions on the shared log 404. For example, the fourth generation 418 may be configured to process the snapshot portion 520 and the recently-added portion 530. As a result, by processing the snapshot portion 520 and the recently-added portion 530, the fourth generation 418 may transition into a state that is representative of the latest state of the SMOSL 400.

It is contemplated that the designation of the first generation 412 as the master generation at the first moment in time 422, the designation of the second generation 414 as the master generation at the second moment in time 424, and the designation of the third generation 416 as the master generation at the third moment in time 426, may have been performed similarly to what has been described above with respect to the designation of the fourth generation 418 as the master generation at the fourth moment in time 428.

Therefore, in summary, it can be said that at a given current moment in time when the shared log 404 is maintained by a given current generation of the SMOSL 400, which is the master generation of the SMOSL 400 at that given current moment in time, a new given generation of the SMOSL 400 may be launched by a given director entity (such as the hive 111 and/or other boot-strappers). This new given generation of the SMOSL 400 is a given master-candidate generation of the SMOSL 400 at the given current moment in time and is configured to transmit a given block request to the shared log 404, and where the given block request is instrumental in (i) preventing execution of write log-actions to the shared log 404 from any generation of the SMOSL 400 having a given GUID that is inferior to the GUID of the given master-candidate generation, and (ii) allowing execution of write log-actions exclusively from the given master-candidate generation.

Once actions in which the block request is instrumental in causing to be executed are executed, the given master-candidate generation is designated as a new given master generation of the SMOSL 400. It can be said that at that moment in time, the exclusive privileges of a previous master generation of the SMOSL 400 are "inherited" by a new master generation of the SMOSL 400.

It is contemplated that, in some embodiments of the present technology, "inheritance" of the exclusive privileges from the previous master generation of the SMOSL 400 by the new master generation of the SMOSL 400 may allow ensuring that at any given moment in time, only a single generation of the SMOSL 400 is able to execute write log-actions on the shared log 404. This "inheritance" of the exclusive privileges from the previous master generation of the SMOSL 400 by the new master generation of the SMOSL 400, in some cases, may mitigate consensus issues between various generations of the SMOSL 400 in a way that does not require a computationally expensive algorithm, such as the consensus algorithm 350, for example. In other words, at least some non-limiting embodiments of the present technology may allow implementation of the distributed processing that do not require implementations of the consensus algorithms and, therefore, be less computational resources intensive (i.e. may allow savings of computational resources if compared to the prior art solutions).

Figure 7:
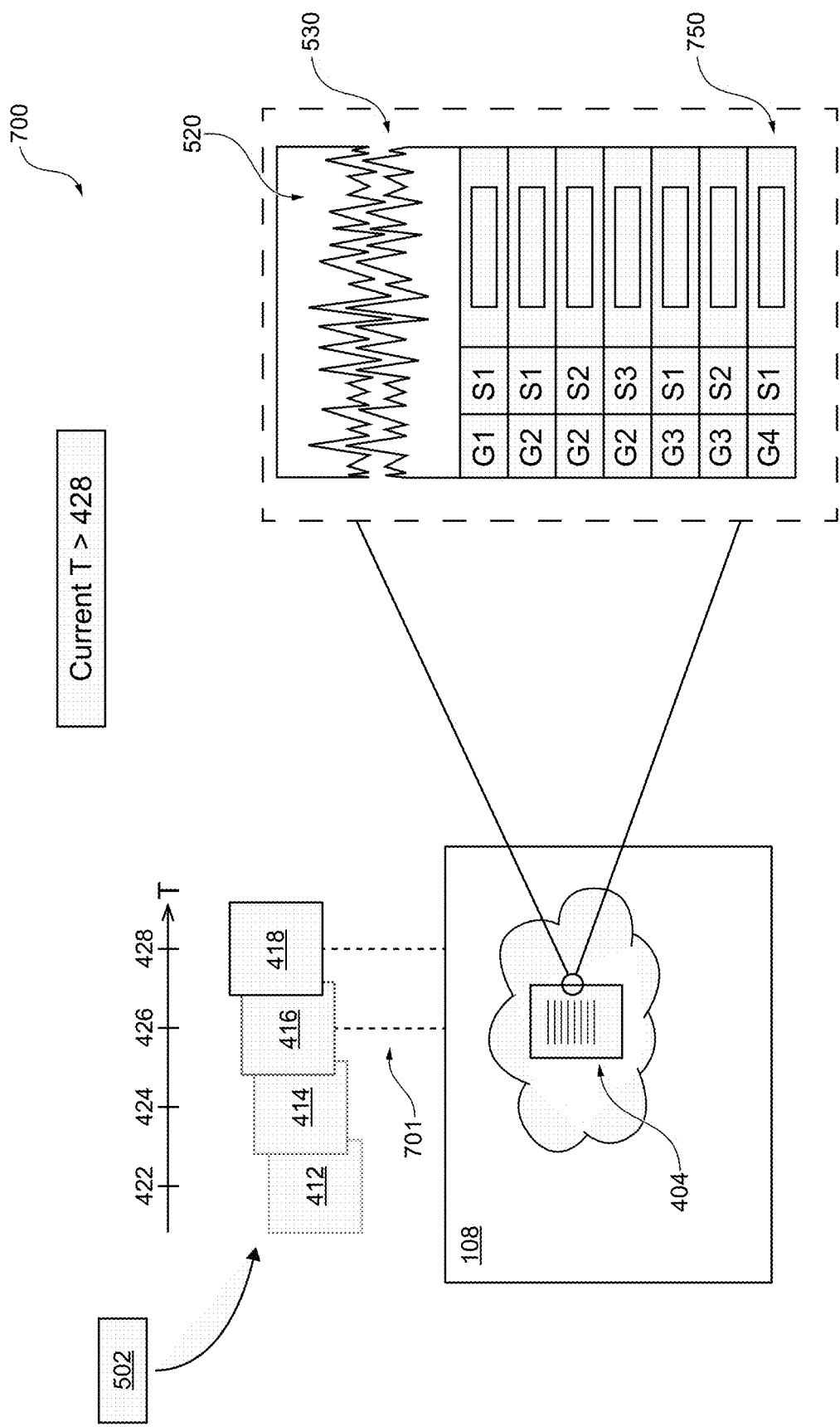
FIG. 7 depicts a third representation of the State Machine of FIG. 4 at a third current time.

With reference to FIG. 7, there is depicted a third representation 700 of the SMOSL 400 at a current moment in time that is later in time than the fourth moment in time 428. At the current moment in time of the third representation 700, the fourth generation 418 is the master generation of the SMOSL 400, as explained above.

Let it be assumed that, at the current moment in time of the third representation 700, the third generation 416 is communicatively re-coupled to the distributed storage sub-system 108, which is illustrated by a re-established communication link 701 in FIG. 7.

In one non-limiting example, if the third generation 416 became communicatively decoupled from the distributed storage sub-system 108 at the fourth moment in time 428 due to a fault in the network of the distributed processing system 100, when the fault in the network of the distributed processing system 100 is resolved, communication between the third generation 416 and the distributed storage sub-system 108 may be re-established.

Irrespective of the reason for which the communication between the third generation 416 and the distributed storage sub-system 108 is re-established, in some cases, the third generation 416 may still be configured to receive data from the data source 502 for processing.

Let it be assumed that, at the current moment in time of the third representation 700, the third generation 416 receives other data from the data source 502 for processing. As a result, in response to receiving the other data from the data source 502, the third generation 416 may be configured to attempt to process the other data and, as explained above, attempts to execute an other write log-action on the shared log 404. The other write log-action may be indicative of inter alia the other data, as explained above.

However, it should be recalled that the master generation of the SMOSL 400 is the fourth generation 418 and that the block request that has been transmitted to the shared log 404 at the fourth moment in time 428, is instrumental in (i) preventing execution of write log-actions to the shared log 404 from any generation of the SMOSL 400 having a given GUID that is inferior to the GUID G4 of the fourth generation 418 and (ii) allowing execution of write log-actions exclusively from the fourth generation 418.

As a result, once the other write log-action is attempted by the third generation 416 at the current moment in time of the third representation 700, the GUID G3 of the third generation 416 may be compared, by the blocking algorithm 610, against the GUID G4 of the master generation of the SMOSL 400 that has exclusive privileges for executing write log-actions on the shared log 404 at the current moment in time of the third representation 700.

The blocking algorithm 610 may determine that the GUID G3 of the third generation 416 is inferior to the GUID G4 of the master generation at the current moment in time of the third representation 700. It can be said that the blocking algorithm 610 may determine that the other write log-action originates from a sequentially previous generation of the SMOSL 400 to the master generation of the SMOSL 400 at the current moment in time of the third representation 700. It can also be said that the blocking algorithm 610 may determine that the other write log-action originates from a previous master generation of the SMOSL 400 that is no longer the master generation of the SMOSL 400 at the current moment in time of the third representation 700. It can also be said that the blocking algorithm 610 may determine that the other write log-action originates from a previous master generation of the SMOSL 400 that no longer has exclusive privileges for executing write log-actions at the current moment in time of the third representation 700.

In response, the blocking algorithm 610 may be configured to block the other write log-action on the shared log 404. It other words, it can be said that the other write log-action on the shared log 404 is prevented from being executed. Put another way, due to the block request that originated from the fourth generation 418 at the fourth moment in time 428, the other write log-action on the shared log 404 is prevented from being executed based on the GUID G3 of the third generation 416 from which the other log-action has originated.

In response to the other write log-action being prevented from execution on the shared log 404, the third generation 416 may be notified of a failed execution of the other write log-action on the shared log 404. As such, the third generation 416 may transmit to the data source 502 a failure message indicative of a failure of the third generation 416 of the SMOSL 400 to process the other data.

In some embodiments of the present technology, the failure message may also be indicative of the master generation of the SMOSL 400 at the current time of the third representation 700. This means that the failure message generated and transmitted by the third generation 416 to the data source 502 may be indicative of the fourth generation 418 being the master generation of the SMOSL 400.

In some embodiments of the present technology, in response to receiving the failure message from the third generation 416, the data source 502 may be configured to transmit the other data to the fourth generation 418 of the SMOSL 400. In response to receiving the other data from the data source 502, the fourth generation 418 is configured to process the other data. To that end, as explained above, the fourth generation 418 may be configured to attempt an additional write log-action to the shared log 404.

As a result, once the additional write log-action is attempted by the fourth generation 418 at the current moment in time of the third representation 700, the GUID G4 of the fourth generation 418, from which the additional write log-action originates, may be compared, by the blocking algorithm 610, against the GUID G4 of the master generation of the SMOSL 400 that has exclusive privileges for executing write log-actions on the shared log 404 at the current moment in time of the third representation 700.

The blocking algorithm 610 may determine that the GUID G4 of the fourth generation 418 is equal to the GUID G4 of the master generation at the current moment in time of the third representation 700. It can be said that the blocking algorithm 610 may determine that the additional write log-action originates from a given generation of the SMOSL 400 that is the master generation of the SMOSL 400 at the current moment in time of the third representation 700. It can also be said that the blocking algorithm 610 may determine that the additional write log-action originates from a generation of the SMOSL 400 that has exclusive privileges for executing write log-actions at the current moment in time of the third representation 700.

In response, the blocking algorithm 610 may be configured to allow the additional write log-action on the shared log 404. It other words, it can be said that the additional write log-action is allowed to be executed on the shared log 404. Put another way, due to the block request that originated from the fourth generation 418 at the fourth moment in time 428, the additional write log-action on the shared log 404 is allowed to be executed based on the GUID G4 of the fourth generation 418 from which the additional log-action originates. Hence, an additional log-entry 750 is therefore generated in the shared log 404 and which is associated with the GUID G4 of the fourth generation 418 of the SMOSL 400.

Method of Processing Data

Figure 8:
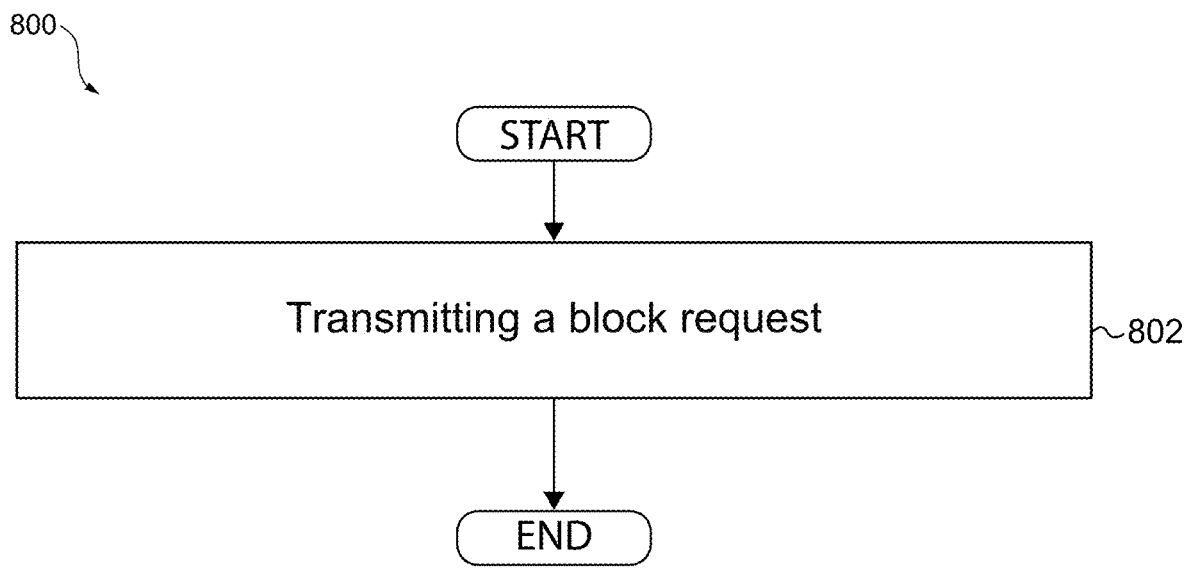
FIG. 8 depicts a block diagram of a method, the method being executable within the system of FIG. 1 and being implemented in accordance with non-limiting embodiments of the present technology.

In some embodiments of the present technology, with reference to FIG. 8, there is provided a method 800 of processing data in a given distributed computer-processing system. For example, the given distributed computer-processing system executing the method 800 may include (i) a given storage device for storing the shared log 404, and (ii) the SMOSL 400 communicatively coupled to the given storage device for maintaining the shared log 404 by executing log-actions (read/write) on the shared log 404. The shared log 404 is configured to store indications of data that is processed by the SMOSL 400.

In some embodiments of the present technology, the data to be processed by the SMOSL 400 may be representative of a given transaction to be executed by the SMOSL 400. For example, the given transaction may be a given deterministic transaction without departing from the scope of the present technology.

In some embodiments of the present technology, the given storage device of the given distributed computer-processing system may be one or more fault-tolerant storage devices. In additional embodiments, the one or more fault-tolerant storage devices may be implemented in a distributed manner. For example, the one or more fault-tolerant storage devices may be one or more storage device 112 of the distributed storage sub-system 108 (see FIG. 1), without departing from the scope of the present technology.

In some embodiments of the present technology, the SMOSL 400 may be considered as a single SM that has a unique system-wide identifier. For example, the given distributed computer-processing system may include a given plurality of SMs. Each one or at least some of the given plurality of SMs may be implemented in the given distributed computer-processing system similarly to how the SMOSL 400 is implemented. Each one of the given plurality of SMs may have a respective unique system-wide identifier in the given distributed computer-processing system.

In some embodiments of the present technology, the given distributed computer-processing system may comprise at least one other SMOSL that is implemented similarly to how the SMOSL 400 is implemented. For example, the at least one other SMOSL may have a uniquely associated other shared log that is implemented similarly to how the shared log 404 of the SMOSL 400 is implemented. As such, it can be said that (i) the at least one other SMOSL, and (ii) the respective uniquely associated other shared log, form together at least one other SMOSL sub-system that may be implemented similarly to how a SMOSL sub-system comprising the SMOSL 400 and the shared log 404 is implemented.

In some embodiments of the present technology, it is contemplated that (i) the SMOSL sub-system comprising the SMOSL 400 and the shared log 404, and (ii) the at least one other SMOSL sub-system comprising the at least one other SMOSL and the respective uniquely associated other shared log, may be configured to operation within the given distributed computer-processing sub-system independently. This means that in some embodiments, processing of data by the at least one other SMOSL sub-system may not affect the processing of data by the SMOSL sub-system comprising the SMOSL 400 and the shared log 404.

In some embodiments of the present technology, it is contemplated that the given distributed computer-processing system may comprise a given database for executing transactions. In some case, the given database may be implemented as the SMOSL 400. In these cases, the shared log 404 may be configured to store data indicative of transactions destined to the given database and which are executed thereby. It can be said that in these cases, the shared log 404 may be configured to track and/or to execute the transactions destined to the given database and which are executed by the given database.

It is also contemplated that the given database may be implemented as a given plurality of SMOSLs, without departing from the scope of the present technology. For example, the given database may be implemented as a given plurality of shards, and where each one of the given plurality of shards is implemented as a respective SMOSL of the given plurality of SMOSLs.

It should be noted that the SMOSL 400 of the given distributed computer-processing system has a given plurality of generations of the SMOSL 400. For example, with reference to FIG. 4, the SMOSL 400 may have the plurality of generations 402, namely: the first generation 412, the second generation 414, the third generation 416, and the fourth generation 418.

Each one of the plurality of generations 402 has a respective GUID. For example, the first generation 412 has a respective GUID G1, the second generation 414 has a respective GUID G2, the third generation 416 has a respective GUID G3, and the fourth generation 418 has a respective GUID G4.

It should be noted that a single one of the plurality of generations 402 is designated as the master generation of the SMOSL 400 at any given moment in time. For example, as explained above:

The first generation 412 is the master generation of the SMOSL 400 between the first moment in time 422 and the second moment in time 424;

The second generation 414 is the master generation of the SMOSL 400 between the second moment in time 422 and the third moment in time 426;

The third generation 416 is the master generation of the SMOSL 400 between the third moment in time 426 and the fourth moment in time 428; and The fourth generation 418 is the master generation of the SMOSL 400 from the fourth moment in time 428, and until a moment in time that a next master generation of the SMOSL 400 is designated.

It should be noted that a given generation of the SMOSL 400 has exclusive privileges for executing write log-actions to the shared log at the any moment in time when the given generation of the SMOSL 400 is the master generation of the SMOSL 400.

It should also be noted that the method 800 may executed at a given current moment in time when the shared log 404 is maintained by a current generation of the SMOSL 400, which is the master generation an the given current moment in time and which is associated with a first given GUID. For example, if the given current moment in time is the second moment in time 424, the current generation of the SMOSL 400 is the first generation 412 associated with the GUID G1. In another example, if the given current moment in time is the third moment in time 426, the current generation of the SMOSL 400 is the second generation 414 associated with the GUID G2. In yet a further example, if the given current moment in time is the fourth moment in time 428, the current generation of the SMOSL 400 is the third generation 416 associated with the GUID G3.

In some embodiments of the present technology, prior to executing step 802 of the method 800, which will be described in greater details herein below, the method 800 may comprise a given director entity (of the given distributed computer-processing system) launching or generating a given master-candidate generation of the SMOSL 400. It can be said that this given master-candidate generation of the SMOSL 400 is a given new generation of the respective plurality of generations of the SMOSL 400.

In some embodiments of the present technology, the given director entity may be implemented as the hive 111 or a given boot-strapping process of the distributed processing system 100, without departing from the scope of the present technology.

In some embodiments, the given directory entity and the SMOSL 400 may be implemented as respective software modules (e.g., computer-executable instructions). It is also contemplated that the given directory entity and the SMOSL 400 may have different characteristics.

Broadly speaking, the hive 111 is configured to supervise various SMs, such as SMOSLs, for example, that are included in a given computer-processing system. For example, the hive 111 may be configured to balance the processing loads of different SMs by launching or potentially shutting down SMs. As mentioned above, the hive 111 may be a given SM. In some embodiments, the hive 111 may be implemented as a given SMOSL.

Broadly speaking, boot-strappers are configured to launch SMOSLs. In some cases, these boot-strappers are employed when the hive 111 is not able to perform the launch. For instance, the hive 111 itself may be launched by a given boot-strapper. Boot-strappers may be configured to launch SMOSLs using heuristic data or other algorithms. In comparison with the boot-strappers the hive 111 may launch new generations in a more reliable manner than boot-strappers.

In some embodiments, the given master-candidate generation of the SMOSL 400 may be generated by the given director entity in response to a failure of a given master generation of the SMOSL 400 at that moment in time. In other embodiments, the given master-candidate generation of the SMOSL 400 may be generated by the given director entity in response to an expiration of a time limit of the master generation of the SMOSL 400 at that moment in time.

As illustrated in FIG. 8, the method 800 comprises the step 802 (executed at the current given moment in time) during which the given master-candidate generation of the SMOSL 400 transmits a given block request to the shared log 404. For example, if the given current moment in time is the second moment in time 424, the given master-candidate generation of the SMOSL 400 that transmits the given block request is the second generation 414. In another example, if the given current moment in time is the third moment in time 426, the given master-candidate generation of the SMOSL 400 that transmits the given block request is the third generation 416. In yet a further example, if the given current moment in time is the fourth moment in time 428, the given master-candidate generation of the SMOSL 400 that transmits the given block request is the fourth generation 418.

It should be noted that the master-candidate generation of the SMOSL 400 has a second given GUID that is sequential to the first given GUID of the master generation of the SMOSL 400 at the given current moment in time. For example, if the given current moment in time is the second moment in time 424, the second given GUID is G2 whereas the first given GUID is G1. In another example, if the given current moment in time is the third moment in time 426, the second given GUID is G3 whereas the first given GUID is G2. In yet a further example, if the given current moment in time is the fourth moment in time 428, the second given GUID is G4 whereas the first given GUID is G3.

It should be noted that the given block request transmitted as part of the step 802 (executed at the given current moment in time) is instrumental in (i) preventing execution of write log-actions to the shared log 404 from any generation of the SMOSL 400 that has a given GUID that is inferior to the second given GUID, and (ii) allowing execution of write log-actions exclusively from the given master-candidate generation of the SMOSL 400.

For example, if the given current moment in time is the second moment in time 424, the given block request transmitted as part of the step 802 is instrumental in (i) preventing execution of write log-actions to the shared log 404 from any generation of the SMOSL 400 that has a given GUID that is inferior to the GUID G2 (such as write log-actions from the first generation 412 having G1), and (ii) allowing execution of write log-actions exclusively from the second generation 414 of the SMOSL 400.

In another example, if the given current moment in time is the third moment in time 426, the given block request transmitted as part of the step 802 is instrumental in (i) preventing execution of write log-actions to the shared log 404 from any generation of the SMOSL 400 that has a given GUID that is inferior to the GUID G3 (such as write log-actions from the first generation 412 having G1, and from the second generation having G2), and (ii) allowing execution of write log-actions exclusively from the third generation 416 of the SMOSL 400.

In yet a further example, if the given current moment in time is the fourth moment in time 428, the given block request transmitted as part of the step 802 is instrumental in (i) preventing execution of write log-actions to the shared log 404 from any generation of the SMOSL 400 that has a given GUID that is inferior to the GUID G4 (such as write log-actions from the first generation 412 having G1, from the second generation having G2, and from the third generation having G3), and (ii) allowing execution of write log-actions exclusively from the fourth generation 418 of the SMOSL 400.

Following the transmission of the given block request, it is contemplated that the given master-candidate generation of the SMOSL 400 is designated as a given master generation of the SMOSL 400, instead of the given current generation of the SMOSL 400.

For example, if the given current moment in time is the second moment in time 424, following the transmission of the given block request, the second generation 414 is designated as the master generation of the SMOSL 400, instead of the first generation of the SMOSL 400.

In another example, if the given current moment in time is the third moment in time 426, following the transmission of the given block request, the third generation 416 is designated as the master generation of the SMOSL 400, instead of the second generation of the SMOSL 400.

In yet a further example, if the given current moment in time is the fourth moment in time 428, following the transmission of the given block request, the fourth generation 418 is designated as the master generation of the SMOSL 400, instead of the third generation of the SMOSL 400.

In some embodiments of the present technology, when the given master-candidate generation of the SMOSL 400 is designated as the master generation of the SMOSL 400, the given master-candidate generation of the SMOSL 400 may be configured to process the shared log 404 at that moment in time. It is contemplated that processing the shared log 404 at that moment in time may allow the master-candidate generation to transition in to a state that is equal to a latest state of the SMOSL 400 at that moment in time.

It is contemplated that as part of processing the shared log 404 by the given master-candidate generation of the SMOSL 400, the given master-candidate generation of the SMOSL 400 may executed read log-actions for processing at least one snapshot portion of the shared log 404 and a given recently-added portion of the shared log 404, as explained above.

In some embodiments of the present technology, it is contemplated that although only a given master generation of the SMOSL 400 may execute write log-actions to the shared log 404 at any given moment in time, other generations of the SMOSL 400 may potentially execute read log-actions form the shared log 404. Therefore, it is contemplated that, although only the given master generation of the SMOSL 400 has exclusive privileges for executing write log-actions to the shared log 404, privileges for executing read log-actions from the shared log 404 may not be exclusive to a single generation of the SMOSL 400, without departing from the scope of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of processing data in a distributed computer system, the method executable in the distributed computer system, the distributed computer system having:
   a storage device for storing a log,
   a state machine communicatively coupled to the storage device for maintaining the log by executing log-actions on the log,
   the log storing indications of the processed data;
   the state machine having a plurality of generations, each one of the plurality of generations having a respective generation-unique identifier (GUID), a single one of the plurality of generations being designated as a master generation of the state machine at any given moment in time, the master generation of the state machine having exclusive privileges for executing write log-actions to the log at the any given moment in time;
   at a current moment in time when the log is maintained by a current generation of the state machine, the current generation of the state machine (i) being the master generation of the state machine at the current moment in time, and (ii) being associated with a first GUID,
   the method comprising:
   transmitting, by a master-candidate generation of the state machine, a block request to the log, the master-candidate generation of the state machine being a new generation of the state machine, the master-candidate generation of the state machine having a second GUID, the second GUID being sequential to the first GUID, the block request being instrumental in:
     (i) preventing execution of write log-actions to the log from any generation of the state machine having a given GUID that is inferior to the second GUID, and
     (ii) allowing execution of write log-actions exclusively from the master-candidate generation of the state machine;
   thereby designating the master-candidate generation of the state machine as the master generation of the state machine, instead of the current generation of the state machine.

2. The method of claim 1, wherein the data is representative of a transaction to be executed by the state machine.

3. The method of claim 1, wherein the storage device is a plurality of fault-tolerant storage devices.

4. The method of claim 3, wherein the plurality of fault-tolerant storage devices are implemented in a distributed manner.

5. The method of claim 1, wherein the state machine is a single state machine having a unique system-wide identifier.

6. The method of claim 1, wherein the distributed computer system comprises another state machine and another respectively associated log, and wherein any given state machine is uniquely associated with a respective log to form a subsystem, and wherein subsystems within the distributed computer system operate independently therebetween.

7. The method of claim 3, wherein the distributed computer system further comprises a database for executing transactions, and wherein the database is implemented as the state machine, and wherein the log stored within the fault-tolerant distributed storage is configured for tracking the transactions destined to the database for execution thereby.

8. The method of claim 1, wherein the distributed computer system comprises a director entity for managing the state machine, and wherein the method further comprises:
   generating, by the director entity, prior to the current moment in time the master-candidate generation of the state machine.

9. The method of claim 8, wherein the master-candidate generation of the state machine is generated in response to a failure of the current generation of the state machine.

10. The method of claim 8, wherein the master-candidate generation of the state machine is generated in response to an expiration of a time limit of the current generation of the state machine.

11. The method of claim 8, wherein all of the director entity and the state machine are implemented as software modules.

12. The method of claim 11, wherein the respective software modules associated with the director entity and the state machine have different characteristics therebetween.

13. The method of claim 1, wherein the method further comprises, at another given moment in time being after the given moment in time during which the current generation of the state machine is no longer designated as the master generation of the state machine:

receiving, by the current generation of the state machine, other data to be processed;

attempting, by the current generation of the state machine, to execute a given write log-action in the log, the given write log-action being indicative of the other data, at the another given moment in time the given write log-action of the current generation of the state machine being prevented from being executed in the log based on the first GUID of the current generation of the state machine.

14. The method of claim 13, wherein the method further comprises:

transmitting, by the current generation of the state machine, a failure message indicative of a failure to process the other data.

15. The method of claim 13, wherein the other data is a transaction and wherein the state machine is implemented as a shard of a database and wherein the transaction is directed to the shard of the database.

16. The method of claim 1, wherein the log is being shared by each one of the plurality of generations of the state machine.

17. The method of claim 16, wherein any one of the plurality of generations of the state machine have read-action privileges to the log irrespective of which one of the plurality of generations of the state machine is the master generation of the state machine.

18. The method of claim 1, wherein when the master-candidate generation of the state machine is designated as the master generation of the state machine, the master-candidate generation of the state machine:

processes the log for transitioning into a latest state of the state machine.

19. The method of claim 18, wherein the log comprises at least one snapshot portion and a recently-added portion, processing the log comprises at least one of:

processing the at least one snapshot portion; and
processing the recently-added portion.

20. A distributed computer system for processing data, having:

a storage device for storing a log,
a state machine communicatively coupled to the storage device for maintaining the log by executing log-actions on the log,
the log storing indications of the processed data;
the state machine having a plurality of generations, each one of the plurality of generations having a respective generation-unique identifier (GUID), a single one of the plurality of generations being designated as a master generation of the state machine at any given moment in time, the master generation of the state machine having exclusive privileges for executing write log-actions to the log at the any given moment in time;
at a current moment in time when the log is maintained by a current generation of the state machine, the current generation of the state machine (i) being the master generation of the state machine at the current moment in time, and (ii) being associated with a first GUID,
a master-candidate generation of the state machine, the master-candidate generation of the state machine being a new generation of the state machine and having a second GUID, the second GUID being sequential to the first GUID, the master-candidate generation being configured to:

transmit a block request to the log, the block request being instrumental in:

(iii) preventing execution of write log-actions to the log from any generation of the state machine having a given GUID that is inferior to the second GUID, and
(iv) allowing execution of write log-actions exclusively from the master-candidate generation of the state machine;

thereby the master-candidate generation of the state machine being designated as the master generation of the state machine, instead of the current generation of the state machine.

21. The system of claim 20, wherein the data is representative of a transaction to be executed by the state machine.

22. The system of claim 20, wherein the storage device is a plurality of fault-tolerant storage devices.

23. The system of claim 22, wherein the plurality of fault-tolerant storage devices are implemented in a distributed manner.

24. The system of claim 20, wherein the state machine is a single state machine having a unique system-wide identifier.

25. The system of claim 20, wherein the distributed computer system comprises another state machine and another respectively associated log, and wherein any given state machine is uniquely associated with a respective log to form a subsystem, and wherein subsystems within the distributed computer system operate independently therebetween.

26. The system of claim 22, wherein the distributed computer system further comprises a database for executing transactions, and wherein the database is implemented as the state machine, and wherein the log stored within the fault-tolerant distributed storage is configured for tracking the transactions destined to the database for execution thereby.

27. The system of claim 20, wherein the distributed computer system comprises a director entity for managing the state machine, and wherein the system is further configured to:

generate prior to the current moment in time the master-candidate generation of the state machine.

28. The system of claim 27, wherein the master-candidate generation of the state machine is generated in response to a failure of the current generation of the state machine.

29. The system of claim 27, wherein the master-candidate generation of the state machine is generated in response to an expiration of a time limit of the current generation of the state machine.

30. The system of claim 27, wherein all of the director entity and the state machine are implemented as software modules.

31. The system of claim 30, wherein the respective software modules associated with the director entity and the state machine have different characteristics therebetween.

32. The system of claim 20, wherein the system is further configured to, at another given moment in time being after the given moment in time during which the current generation of the state machine is no longer designated as the master generation of the state machine:

receive, by the current generation of the state machine, other data to be processed;
attempt, by the current generation of the state machine, to execute a given write log-action in the log, the given write log-action being indicative of the other data, at the another given moment in time the given write log-action of the current generation of the state machine being prevented from being executed in the log based on the first GUID of the current generation of the state machine.

33. The system of claim 32, wherein the system is further configured to:
transmit, by the current generation of the state machine, a failure message indicative of a failure to process the other data.

34. The system of claim 32, wherein the other data is a transaction and wherein the state machine is implemented as a shard of a database and wherein the transaction is directed to the shard of the database.

35. The system of claim 20, wherein the log is being shared by each one of the plurality of generations of the state machine.

36. The system of claim 35, wherein any one of the plurality of generations of the state machine have read-action privileges to the log irrespective of which one of the plurality of generations of the state machine is the master generation of the state machine.

37. The system of claim 20, wherein when the master-candidate generation of the state machine is designated as the master generation of the state machine, the master-candidate generation of the state machine:
processes the log for transitioning into a latest state of the state machine.

38. The system of claim 37, wherein the log comprises at least one snapshot portion and a recently-added portion, processing the log comprises at least one of:
processing the at least one snapshot portion; and
processing the recently-added portion.

\* \* \* \* \*